(12) United States Patent
Boudreau et al.

(10) Patent No.: US 12,531,597 B2
(45) Date of Patent: Jan. 20, 2026

(54) DISTRIBUTED COORDINATED DOWNLINK PRECODING FOR MULTI-CELL MIMO WIRELESS NETWORK VIRTUALIZATION

(71) Applicant: Telefonaktiebolaget LM Ericsson (publ), Stockholm (SE)

(72) Inventors: Gary Boudreau, Kanata (CA); Juncheng Wang, Toronto (CA); Ben Liang, Whitby (CA); Min Dong, Whitby (CA); Hatem Abou-Zeid, Calgary (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 469 days.

(21) Appl. No.: 17/928,024

(22) PCT Filed: May 28, 2021

(86) PCT No.: PCT/IB2021/054717
§ 371 (c)(1),
(2) Date: Nov. 28, 2022

(87) PCT Pub. No.: WO2021/240475
PCT Pub. Date: Dec. 2, 2021

(65) Prior Publication Data
US 2023/0223992 A1 Jul. 13, 2023

Related U.S. Application Data

(60) Provisional application No. 63/032,150, filed on May 29, 2020.

(51) Int. Cl.
*H04B 7/06* (2006.01)
*H04B 7/024* (2017.01)
*H04B 7/0452* (2017.01)

(52) U.S. Cl.
CPC ........... *H04B 7/024* (2013.01); *H04B 7/0452* (2013.01)

(58) Field of Classification Search
None
See application file for complete search history.

(56) References Cited

U.S. PATENT DOCUMENTS

2014/0177461 A1 6/2014 Seyedmehdi et al.
2014/0317241 A1 10/2014 Zhao et al.
(Continued)

FOREIGN PATENT DOCUMENTS

WO 2018207031 A1 11/2018

OTHER PUBLICATIONS

International Search Report and Written Opinion dated Aug. 31, 2021 issued in PCT Application No. PCT/IB2021/054717, consisting of 13 pages.
(Continued)

*Primary Examiner* — Minh Trang T Nguyen
(74) *Attorney, Agent, or Firm* — Sage Patent Group

(57) ABSTRACT

A method and network node for distributed coordinated downlink precoding for multi-cell multiple input multiple output (MIMO) wireless network virtualization are disclosed. According to one aspect, a network node is configured to, in each of a plurality of successive transmission time periods: transmit to each of a plurality of SPs a corresponding set of channel information; receive from each of the plurality of SPs a service demand and a normalized precoding matrix, the normalized precoding matrix being determined by the corresponding SP based on the corresponding set of channel information; allocate a virtual transmit power to each of the plurality of SPs based at least in part on the received service demands and normalized precoding matrices; and determine a downlink precoding matrix to transmit
(Continued)

messages to WDs, the downlink precoder matrix being based at least in part on the received service demands and normalized precoding matrices.

20 Claims, 17 Drawing Sheets

(56) References Cited

U.S. PATENT DOCUMENTS

| | | | |
|---|---|---|---|
| 2016/0081033 A1* | 3/2016 | Ouchi | H04L 5/14 455/522 |
| 2017/0019297 A1 | 1/2017 | Rakib | |
| 2017/0064675 A1 | 3/2017 | Kim et al. | |
| 2018/0248639 A1 | 8/2018 | He et al. | |
| 2018/0279376 A1* | 9/2018 | Dinan | H04W 74/0836 |
| 2018/0331731 A1 | 11/2018 | Boudreau et al. | |
| 2019/0260434 A1 | 8/2019 | Park et al. | |
| 2023/0014932 A1 | 1/2023 | Huang et al. | |

OTHER PUBLICATIONS

Stephen Boyd et al., Convex Optimization; Department of Electrical Engineering Stanford University; Cambridge University, 2004, consisting of 730 pages.
Jonathan Van De Belt, et al., Defining and Surveying Wireless Link Virtualization and Wireless Network Virtualization; IEEE Communications Surveys & Tutorials, vol. 19, No. 3, Third Quarter 2017, consisting of 25 pages.
Kin Wang et al., Wireless Network Virtualization; 2013 International Conference on Computing, Networking and Communications, Invited Position Papers, consisting of 5 pages.
Chengchao Liang et al., Wireless Network Virtualization: A Survey, Some Research Issues and Challenges; IEEE Communications Surveys and Tutorials, 2014, consisting of 24 pages.
Matias Richart et al., Resource Slicing in Virtual Wireless Networks: A Survey; IEEE Transactions on Network and Service Management, vol. 13, No. 3; Sep. 2016, consisting of 15 pages.
Vikas Jumba et al., Resource Provisioning in Wireless Virtualized Networks via Massive-MIMO; IEEE Wireless Communications Letters, vol. 4, No. 3, Jun. 2015, consisting of 4 pages.
Zheng Chang, Energy Efficient Optimization for Wireless Virtualized Small Cell Networks With Large-Scale Multiple Antenna; IEEE Transactions on Communications, vol. 65, No. 4, Apr. 2017, consisting of 12 pages.
Kun Zhu et al., Virtualization of 5G Cellular Networks as a Hierarchical Combinatorial Auction, IEEE Transactions on Mobile Computing, vol. 15, No. 10, Oct. 2016, consisting of 15 pages.
Saeedeh Parsaeefard et al., Dynamic Resource Allocation for Virtualized Wireless Networks in Massive-MIMO-Aided and Fronthaul-Limited C-RAN; IEEE Transactions on Vehicular Technology, vol. 66, No. 10, Oct. 2017, consisting of 9 pages.
Daniel Tweed et al., Dynamic Resource Allocation for Uplink MIMO NOMA VWN with Imperfect SIC; IEEE Int. Conf. Commun. (ICC), May 2018, consisting of 6 pages.
Ye Liu et al., Antenna Allocation and Pricing in Virtualized Massive MIMO Networks via Stackelberg Game; IEEE Transactions on Communications, vol. 66 No. 11, Nov. 2018, consisting of 15 pages.
Mohammadmoein Soltanizadeh et al., Power Minimization in Wireless Network Virtualization with Massive MIMO; Proc. Intel. Conf. Commun. (ICC) Workshops; IEEE May 2018, consisting of 6 pages.
Juncheng Wang et al., Online Downlink MIMO Wireless Network Virtualization in Fading Environments; Proc. IEEE Global Commun. Conf. (GLOBECOM), Dec. 2019, consisting of 6 pages.
Juncheng Wang et al., Online Precoding Design for Downlink MIMO Wireless Network Virtualization with Imperfect CSI; IEEE Int. Conf. Comput. Commun. (INFOCOM), Apr. 2020, consisting of 9 pages.
Juncheng Wang et al., Online MIMO Wireless Network Virtualization Over Time-Varying Channels with Periodic Updates; 2020 IEEE 21st International Workshop on Signal Processing Advances in Wireless Communications (SPAWC), consisting of 5 pages.
N.M. Mosharaf Kabir Chowdhury et al., Network Virtualization: State of the Art and Research Challenges; Topics in Network and Service Management; IEEE Communications Magazine, Jul. 2009, consisting of 7 pages.
David Gespert et al., Multi-Cell MIMO Cooperative Networks: A New Look at Interference; IEEE Journal on Selected Areas in Communications, vol. 28, No. 9, Dec. 2010, consisting of 29 pages.
Hongyuan Zhang et al., Asynchronous Interference Mitigation in Cooperative Base Station Systems; IEEE Transactions on Wireless Communications, vol. 7, No. 1; Jan. 2008, consisting of 11 pages.
Hayssam Dahrouj et al., Coordinated Beamforming for the Multi-Cell Multi-Antenna Wireless System; IEEE Transactions on Wireless Communications; 2008, consisting of 6 pages.
Luca Venturino et al., Coordinated Linear Beamforming in Downlink Multi-Cell Wireless Networks; IEEE Transactions on Wireless Communications, vol. 9, No. 4; Apr. 2010, consisting of 11 pages.
Desmond W. H. Cai, et al., Max-Min SINR Coordinated Multipoint Downlink Transmission—Duality and Algorithms; IEEE Transactions on Signal Processing, vol. 60, No. 10; Oct. 2012, consisting of 12 pages.
Harri Holma et al., UTRAN Long-Term Evolution; WCDMA for UMTS: HSPA Evolution and LTE, Fifth Edition; 2010 John Wiley & Sons, Ltd., consisting of 29 pages.
Ami Wiesel, et al., Linear Precoding via Conic Optimization for Fixed MIMO Receivers; IEEE Transactions on Signal Processing, vol. 54, No. 1; Jan. 2006, consisting of 16 pages.
Yi Jiang, et al., Performance Analysis of ZF and MMSE Equalizers for MIMO Systems: An In-Depth Study of the High SNR Regime; IEEE Transactions on Information Theory, vol. 57, No. 4; Apr. 2011, consisting of 19 pages.
Roberto Corvaja et al., Phase Noise Degradation in Massive MIMO Downlink With Zero-Forcing and Maximum Ratio Transmission Precoding; IEEE Transactions on Vehicular Technology, Vo. 65, No. 10; Oct. 2016, consisting of 8 pages.
Oren Somekh, et al., Cooperative Multicell Zero-Forcing Beamforming in Cellular Downlink Channels; IEEE Transactions on Information Theory, vol. 55, No. 7; Jul. 2009, consisting of 14 pages.
Office Action Summary dated Oct. 3, 2023 issued in U.S. Appl. No. 17/789,951, consisting of 29 pages.
International Search Report and Written Opinion dated Nov. 9, 2021 issued in PCT Application No. PCT/IB2021/057106 filed Aug. 3, 2021, consisting of 17 pages.
Shai Shalev-Shwartz, Online Learning and Online Convex Optimization; Foundations and Trends in Machine Learning, vol. 4; Feb. 2012, consisting of 22 pages.
Elad Hazan, Introduction to Online Convex Optimization; Foundations and Trends Optim. vol. 2, Aug. 2016, consisting of 178 pages.
Martin Zinkevic, Online Convex Programming and Generalized Infinitesimal Gradient Ascent; Proc. Intel. Conf. Mach. Learn. (ICML), 2003, consisting of 8 pages.
Eric C. Hall et al., Online Convex Optimization in Dynamic Environments, IEEE Journal of Selected Topics in Signal Processing, vol. 9, No. 4, Jun. 2015, consisting of 16 pages.
Ali Jadbabaie et al., Online Optimization: Competing with Dynamic Comparators, Proc. Intel. Conf. Artif. Intell. Statist., May 2015, consisting of 9 pages.
Mehrdad Mahdavi et al., Trading Regret for Efficiency: Online Convex Optimization with Long Term Constraints; Journal of Machine Learning Research; Sep. 2012, consisting of 26 pages.
Rodolphe Jenatton et al., Adaptive Algorithms for Online Convex Optimization with Long-term Constraints; Proc. Intel. Conf. Mach. Learn. (ICML), Jun. 2016, consisting of 10 pages.I. Conf. Mach. Learn. (ICML), Jun. 2016, consisting of 10 pages.
Hao Yu et al., A Low Complexity Algorithm with $O(\sqrt{T})$ Regret and $O(1)$ Constraint Violations for Online Convex Optimization with Long Term Constraints; Journal of Machine Learning Research, vol. 21, Feb. 2020, consisting of 24 pages.
Tianyi Chen et al., An Online Convex Optimization Approach to Proactive Network Resource Allocation; IEEE Transactions on Signal Processing, vol. 65, No. 24; Dec. 15, 2017, consisting of 15 pages.

(56) References Cited

OTHER PUBLICATIONS

Xuanyu Cao, et al., A Virtual-Queue-Based Algorithm for Constrained Online Convex Optimization With Applications to Data Center Resource Allocation; IEEE Journal of Selected Topics in Signal Processing, vol. 12, No. 4, Aug. 2018, consisting of 14 pages.
John Langford et al., Slow Learners are Fast; Proc. Adv. Neural Info. Proc. Sys. (NIPS), 2009, consisting of 9 pages.
H. Brendan McMahan et al., Delay-Tolerant Algorithms for Asynchronous Distributed Online Learning; Proc. Adv. Neural Info. Proc. Sys. (NIPS), 2014, consisting of 9 pages.
Kent Quanrud et al., Online Learning with Adversarial Delays, Proc. Adv. Neural Info. Proc. Sys. (NIPS), 2015, consisting of 9 pages.
Xuanyu Cao et al., Impact of Delays on Constrained Online Convex Optimization; Proc. Asilomar Conf. Signal Sys. Compu., Nov. 2019, consisting of 4 pages.
M.J. Neely et al., Stochastic Network Optimization with Application to Communication and Queueing Systems; Morgan & Claypool; 2010, consisting of 211 pages.
Antti Toskala et al., UTRAN Long-Term Evolution; John Wiley & Sons, Ltd.; 2010, consisting of 29 pages.
Muriel Medard, The Effect upon Channel Capacity in Wireless Communications of Perfect and Imperfect Knowledge of the Channel; IEEE Transactions on Information Theory, vol. 46, No. 3; May 2000, consisting of 14 pages.
Ibrahim Abou-Faycal et al., Binary Adaptive Coded Pilot Symbol Assisted Modulation Over Rayleigh Fading Channels Without Feedback; IEEE Transactions on Communications, vol. 53, No. 6; Jun. 2005, consisting of 11 pages.
Leonidas Georgiadis et al., Resource Allocation and Cross Layer Control in Wireless Networks; Found. Trends Networks; 2006 Now Publishers Inc., consisting of 146 pages.
Tianyi Chen, et al., Stochastic Averaging for Constrained Optimization With Application to Online Resource Allocation; IEEE Transactions on Signal Processing, vol. 65, No. 12; Jun. 2017, consisting of 16 pages.
International Search Report and Written Opinion dated Jun. 9, 2020 issued in PCT Application No. PCT/IB2020/053454, consisting of 15 pages.
Sucha Supittayapornpong et al., Quality of Information Maximization for Wireless Networks via a Fully Separable Quadratic Policy; IEEE/ACM Transactions on Networking, vol. 23, No. 2, Apr. 2015, consisting of 13 pages.
Juncheng Wang et al., Online Downlink MIMO Wireless Network Virtualization in Fading Environments, IEEE, 2019, consisting of 5 pages.
Xin Wang et al., Wireless Network Virtualization, Journal of Communications vol. 8, No. 5, May 2013, consisting of 8 pages.
Fatemeh Amirnavaei, et al., Online Power Control Optimization for Wireless Transmission With Energy Harvesting and Storage, IEEE Transactions on Wireless Communications, Jul. 2016, consisting of 14 pages.
Panayotis Mertikopoulos et al., Learning to Be Green: Robust Energy Efficiency Maximation in Dynamic MIMO-OFDM Systems, IEEE Journal on Selected Areas in Communications, Apr. 2016, consisting of 25 pages.
Panayotis Mertikopoulos et al., Learning in an Uncertain World: MIMO Covariance Matrix Optimization with Imperfect Feedback, IEEE Transactions on Wireless Communications, Jun. 2017, consisting of 27 pages.
Hao Yu, et al., Dynamic Transmit Covariance Design in MIMO Fading Systems with Unknown Channel Distributions and Inaccurate Channel State Information, IEEE Transactions on Wireless Communications, Jun. 2017, consisting of 16 pages.
Andrea Goldsmith, Wireless Communications, Stanford University Press, 2005, consisting of 427 pages.
Antonio Assalini et al., Linear MMSE MIMO Channel Estimation with Imperfect Channel Covariance Information, Proc. Intel. Conf. Communications (ICC) Jun. 2009, consisting of 6 pages.
Non Final Office Action dated Mar. 15, 2022 issued in U.S. Appl. No. 17/425,427, consisting of 19 pages.
Non Final Office Action dated Sep. 29, 2022 issued in U.S. Appl. No. 17/425,427, consisting of 11 pages.
Notice of Allowance dated May 12, 2023 issued in U.S. Appl. No. 17/425,427, consisting of 11 pages.
International Search Report and Written Opinion dated Sep. 24, 2020 issued in PCT Application No. PCT/IB2020/053022, consisting of 14 pages.
Alec Koppel et al., A Saddle Point Algorithm for Networked Online Convex Optimization, IEEE Transactions on Signal Processing, vol. 63, No. 19, Oct. 2015, consisting of 16 pages.
Alec Koppel et al., Proximity Without Consensus in Online Mutiagent Optimization, IEEE Transactions on Signal Processing, vol. 65, No. 12, Jun. 2017, consisting of 16 pages.
Michael J. Neely et al., Online Convex Optimization with Time-Varying Constraints, University of Southern California, 2017, consisting of 18 pages.
Marcelo J. Weinberger et al., On Delayed Prediction of Individual Sequences, IEEE Trans. Inf. Theory, vol. 48, No. 7, Jul. 2002, consisting of 43 pages.
Pooria Joulani et al., Delay-Tolerant Online Convex Optimization: Unified Analysis and Adaptive-Gradient Algorithms, Proceedings of the Thirtieth AAAI Conference on Artificial Intelligence (AAAI-16) 2016, consisting of 7 pages.
Jim Zyren et al., Overview of the 3GPP Long Term Evolution Physical Layer, Freescale Semiconductor Inc., 2007, consisting of 27 pages.
D.H. Brandwood, A Complex Gradient Operator and its Application in Adaptive Array Theory, IEEE Proceedings H-Microwaves, Optics, and Antennas, Feb. 1983, consisting of 6 pages.
Michael C. Grant et al., The CVX User's Guide Release 2.1, Dec. 2018, consisting of 99 pages.
Matias Richart et al., Resource Slicing in Virtual Wireless Networks: A Survey, IEEE Transactions on Network and Service Management, Sep. 2016, consisting of 14 pages.
V. Jumba et al., Resource Provisioning in Wireless Virtualized Networks Via Massive-MIMO, IEEE Wireless Communications Letters, Jun. 2015, consisting of 5 pages.
Kun Zhu et al., Virtualization of 5G Cellular Networks as a Hierarchical Combinatorial Auction, IEEE Transations on Mobile Computing, 2016, consisting of 16 pages.
Saeedeh Parsaeefard et al., Dynamic Resource Allocation for Virtualized Wireless Networks in Massive-MIMO-Aided and Fronthaul-Limited C-RAN, Oct. 2017, consisting of 10 pages.
Hao Yu et al., A Low Complexity Algorithm with $O(\sqrt{T})$ Regret and Finite Constraint Violations for Online Convex Optimization with Long Term Constraints, Department of Electrical Engineering, University of Southern California, Oct. 2016, consisting of 15 pages.
Wang et al., Online Precoding Design for Downlink MIMO Wireless Network Virtualization with Imperfect CSI; IEEE INFOCOM 2020; IEEE Conference on Computer Communications, IEEE; Jul. 6, 2020, consisting of 10 pages.
Hayssam Dahrouj et al., Coordinated Beamforming for the Multi-Cell Multi-Antenna Wireless System; IEEE Transactions on Wireless Communications, vol. 9; 2008, consisting of 6 pages.

\* cited by examiner

DISTRIBUTED COORDINATED DOWNLINK PRECODING FOR MULTI-CELL MIMO WIRELESS NETWORK VIRTUALIZATION

CROSS-REFERENCE TO RELATED APPLICATIONS

This application is a Submission Under 35 U.S.C. § 371 for U.S. National Stage Patent Application of International Application No.: PCT/IB2021/054717, filed May 28, 2021 entitled "DISTRIBUTED COORDINATED DOWNLINK PRECODING FOR MULTI-CELL MIMO WIRELESS NETWORK VIRTUALIZATION," which claims priority to U.S. Provisional Application No. 63/032,150, filed May 29, 2020, entitled "DISTRIBUTED COORDINATED DOWNLINK PRECODING FOR MULTI-CELL MIMO WIRELESS NETWORK VIRTUALIZATION," the entireties of both of which are incorporated herein by reference.

TECHNICAL FIELD

The present disclosure relates to wireless communications, and in particular, to distributed coordinated downlink precoding for multi-cell multiple input multiple output (MIMO) wireless network virtualization (WNV).

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), in local and wide area wireless networks.

The large capital and operational expenses of implementing and operating wide-area wireless networks discourage service providers (SPs) from deploying modern technologies and also hinder new companies from entering the industry. In response, network virtualization has been proposed to reduce the expenses of network deployment and operation by abstracting and sharing physical resources, and to make it easier to migrate to newer products and technologies by decoupling distinct parts of the network. Network virtualization is particularly important when physical infrastructure is expensive, for example, in a shopping mall with a high density of service requests but limited space to install many wireless base stations.

A virtualized network is generally composed of an infrastructure provider (InP) that owns and manages the infrastructure, and multiple SPs that utilize the resources to provide services to their subscribing users. An InP virtualizes the physical resources that it owns and splits them into virtual slices. The SPs lease these virtual resources, and operate them to provide end-to-end services to end-users without needing to know the underlying physical architecture of the InP. Thus, virtualization creates a set of logical entities from a given set of physical entities in a manner that is transparent to the SPs and their users. By enabling abstraction and sharing of the physical resources, maximization of the utilization of the resources is achieved, while providing the required quality of service (QoS) demanded by individual SPs without requiring each SP to consider the complex underlying physical interaction among SPs.

To fulfill the potential of network virtualization to improve resource utilization and network efficiency, dynamic resource allocation strategies are needed to ensure service isolation among SPs, i.e., service to the users of one SP should be minimally affected by the other SPs. However, service isolation is particularly challenging in wireless networks, due to radio interference in the open transmission environment. Existing approaches on MIMO wireless network virtualization (WNV) can be categorized into two streams: strict service isolation and spatial service isolation.

A concept associated with strict service isolation is to apply strict resource separation to achieve isolation, by dividing the wireless spectrum, resource blocks (RBs) or antenna hardware among different SPs. Such an approach is rooted in existing methods in computer virtualization and wired network virtualization, and it has been shown to be highly effective. However, strict service separation limits the design space of virtualization in the wireless environment, as it does not take advantage of the improved power and spectral efficiency that can be achieved by more flexible sharing of the wireless medium. In contrast, a salient feature of the spatial service isolation method is that it leverages the interference suppression capability of MIMO communications to achieve effective service isolation in the coding space, through specially designed InP precoding. It has been shown that, through proper precoding instead of slicing resources physically, the InP can enforce the requirements of isolation by leveraging MIMO precoding, while improving the overall efficacy of the network.

In a non-virtualized network, joint signal processing across multiple cells can significantly improve the system performance of a conventional single-cell network. There are two signal processing streams: cooperative precoding and coordinated precoding. The basic idea of cooperative precoding (also called network MIMO) is to treat antennas from multiple cells as a large single antenna array. This requires stringent signal-level coordination and global channel state information (CSI) sharing across the cells. In contrast, coordinated precoding does not need to share data streams and global CSI among the cells, through precoding-level coordination. Although coordinated precoding has been well studied in non-virtualized wireless networks, new challenges arise when it comes to coordinated multi-cell MIMO WNV. Since each SP in a given cell does not have access to the CSI of the users of other SPs in the given cell and all the users in other cells, handling the interference between the users of different SPs and cells is challenging. For example, if the InP blindly uses each SP's precoding matrix in a cell without considering the users of other SPs in the cell and all users in the other cells, the system will incur a large amount of interference between SPs.

Among existing research efforts on MIMO WNV that enforce strict service isolation, throughput maximization and energy minimization in orthogonal frequency division multiplexing (OFDM) massive MIMO systems have been studied. Exclusive sub-carriers are allocated among the SPs through a two-level hierarchical auction architecture in one such study. Cloud radio networks and non-orthogonal multiple access techniques have been combined with virtualized MIMO systems in other studies. Antennas are allocated among the SPs through pricing for massive MIMO virtualization in one study. The strict service isolation approach does not fully utilize the benefit of spatial spectrum sharing enabled by MIMO beamforming. In contrast, another study looks at stochastic robust precoding for massive MIMO WNV to allow simultaneous antenna and wireless spectrum sharing among the SPs. Online MIMO WNV with perfect and imperfect CSI have also been studied. A periodic updating scheme has been proposed for online MIMO WNV with delayed CSI. It has further been demonstrated in that for single-cell MIMO WNV, the spatial service isolation approach substantially outperforms the strict service isolation approach. All of the aforementioned studies have focused on single-cell MIMO WNV. In multi-cell spatial service virtualization, since each SP does not consider the inter-SP interference or the inter-cell interference, handling the interference and satisfying the virtualization demand from the SPs simultaneously is challenging. For instance, if the InP allocates full transmit power to the SPs for their virtual precoding designs, the demanded system performance from the SPs is hardly satisfied at the InP due to the limited precoding space left for interference control. This can further lead to system performance deterioration.

Multi-cell cooperative precoding (without virtualization) has been shown to significantly improve the system performance of wireless networks by having multiple base stations (BSs) cooperate at the signal level for efficient inter-cell interference mitigation. The asynchronous interference issue for multi-cell cooperative precoding has been studied. However, the data streams and global CSI of all users must be shared among all cooperating cells. In contrast, it has been proposed that multiple cells can coordinate at the beamforming level without sharing the data streams. Weighted sum transmit power minimization subject to signal-to-interference-plus-noise-ratio (SINR) constraints has been studied. The joint power control and weighted sum rate maximization problem has also been addressed, which requires CSI exchange across the cells. The problem of maximizing the minimum SINR subject to multiple weighted sum power constraints has also been studied, which requires fully coordinated transmit power updates across the cells.

Existing coordinated precoding schemes for non-virtualized networks are of high computational complexity and require CSI exchanges or transmit power updates across the cells through the backhaul links. Practical multi-cell MIMO systems desire lower level of coordination, information exchange, and implementation complexity.

SUMMARY

Some embodiments advantageously provide methods and network nodes for distributed coordinated downlink precoding for multi-cell multiple input multiple output (MIMO) wireless network virtualization (WNV).

In some embodiments, a system at the infrastructure provider (InP), via a network node owned by the InP, achieves certain system performance through controlling the interference and satisfying the virtualization demand of the SPs in a balanced manner. Simulations show that certain system performance can be achieved in a virtualized multi-cell MIMO network, through balancing the signal leakage and precoding deviation from virtualization demand, which results in convex programming. Furthermore, in some embodiments, a coordinated precoding solution disclosed herein is fully distributed without any channel state information (CSI) exchange and transmit power update across the cells, and is in a semi-closed form, which significantly decreases the precoding design complexity.

In some embodiments, the downlink multi-cell MIMO WNV is formulated as a coordinated precoding optimization problem, in which all antennas and wireless spectrum resources are shared among the SPs in each cell. Using this multi-cell spatial virtualization framework, in each cell, each SP can demand a normalized virtual precoding based on the service needs of its users, without considering either the inter-SP or the inter-cell interference. The InP coordinates the cells at the precoding level to achieve certain desired system performance, subject to per-cell transmit power limits.

Given that the system performance is highly correlated to the signal leakage and precoding deviation from virtualization demand, some embodiments employ three convex precoding optimization methods to balance the impacts of signal leakage and satisfaction of virtualization demand on system performance:

1. weighted sum of leakage and precoding deviation minimization;
2. leakage minimization; and
3. precoding deviation minimization.

One advantage of the weighted sum minimization problem for coordinated multi-cell MIMO WNV in some embodiments is that it supports a fully distributed semi-closed-form solution, without any CSI exchange or transmit power update across the cells. Analysis shows that solving the weighted sum minimization problem can achieve better system performance than solving the other two more complicated precoding optimization problems.

In addition, some embodiments implement a scheme to design virtual transmit power allocation. By using this scheme, a closed-form solution with low computational complexity is obtained.

Some additional information on the performance evaluation is as follows. Extensive simulation studies have been conducted to validate the performance of the proposed coordinated precoding scheme for multi-cell MIMO WNV, under typical urban micro-cell Long-Term Evolution (LTE) network settings. Further performance comparison with cooperative zero forcing (ZF) precoding demonstrates that the closed-form coordinated precoding scheme is close to optimum.

According to one aspect, a network node is configured to communicate with a plurality of service providers (SP) and wireless devices (WDs). The network node includes a radio interface and/or comprising processing circuitry configured to: in each of a plurality of successive transmission time periods: transmit to each of a plurality of SPs m a corresponding set of channel information, $H^m$; receive from each of the plurality of SPs a service demand and a normalized precoding matrix, $W^m$, the normalized precoding matrix $W^m$ being determined by the corresponding SP based on the corresponding set of channel information $H^m$; allocate a virtual transmit power $\alpha^m P^w$ to each of the plurality of SPs based at least in part on the received service demands and normalized precoding matrices, $W^m$; and determine a downlink precoding matrix, V, to transmit messages to WDs, the downlink precoder matrix V being based at least in part on the received service demands and normalized precoding matrices, $W^m$.

According to this aspect, in some embodiments, the virtual transmit power allocations are determined that provide a specified balance between interference suppression/virtualization demand attainment and achieving a specified performance. In some embodiments, providing the specified balance is based at least in part on allocation of a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\sum_{m \in M} \alpha_c^m = 1$, and $P_c^{max}$ a maximum transmit power limit on the BS in cell c. In some embodiments, the processing circuitry is further configured to determine the virtual transmit power allocations in a semi-closed form. In some embodiments, the processing circuitry is further configured to determine the virtual transmit power allocations in a closed form. In some embodiments, the processing circuitry is further configured to coordinate C cells at a beamforming level to determine the downlink precoding matrix V to meet a virtualization demand D based at least in part on the received service demands from the SPs. In some embodiments, the determination of a downlink precoding matrix, V is based at least in part on a leakage function and a precoding deviation function. In some embodiments, the downlink precoding matrix, V is based at least in part on minimization of a weighted sum of leakage and precoding deviation subject to per-cell maximum transmit power constraints. In some embodiments, the processing circuitry and/or radio interface are further configured to base the allocation of virtual transmit power $\alpha^m P^w$ on the received normalized precoding matrix, $W^m$, without exchange of channel state information (CSI) or transmit coordination across cells served by the network node.

According to another aspect, a method implemented in a network node in communication with a plurality of service providers (SPs) and wireless devices (WDs) includes, in each of a plurality of successive transmission time periods: transmitting to each of a plurality of SPs m a corresponding set of channel information, $H^m$; receiving from each of the plurality of SPs a service demand and a normalized precoding matrix, $W^m$, the normalized precoding matrix $W^m$ being determined by the corresponding SP based on the corresponding set of channel information $H^m$; allocating a virtual transmit power $\alpha^m P^w$ to each of the plurality of SPs based at least in part on the received service demands and normalized precoding matrices, $W^m$; and determining a downlink precoding matrix, V, to transmit messages to WDs, the precoder matrix V being based at least in part on the received service demands and normalized precoding matrices, $W^m$.

According to this aspect, in some embodiments, the allocating of virtual transmit powers is based on least in part on attaining a specified balance between interference suppression/virtualization demand and achieving a specified performance. In some embodiments, providing the specified balance is based at least in part on allocating a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\sum_{m \in M} \alpha_c^m = 1$, and $P_c^{max}$ a maximum transmit power limit on the BS in cell c. In some embodiments, the method further includes determining the virtual transmit power allocations in a semi-closed form. In some embodiments, the method further includes determining the virtual transmit power allocations in a closed form. In some embodiments, the method further includes coordinating C cells at a beamforming level to determine the downlink precoding matrix V to meet a virtualization demand D based at least in part on the received service demands from the SPs. In some embodiments, the determination of a downlink precoding matrix, V is based at least in part on a leakage function and a precoding deviation function. In some embodiments, the downlink precoding matrix, V is based at least in part on minimization of a weighted sum of leakage and precoding deviation subject to per-cell maximum transmit power constraints. In some embodiments, the method further includes basing the allocation of virtual transmit power $\alpha^m P^w$ on the received normalized precoding matrix, $W^m$, without exchange of channel state information (CSI) or transmit coordination across cells served by the network node.

According to yet another aspect, a network node configured to communicate with a plurality of service providers (SPs) and wireless devices (WDs) is provided. The network node includes a radio interface configured to: in each of a plurality of successive transmission time periods: transmit to each of a plurality of SPs m a corresponding set of channel information, $H^m$; and receive from each of the plurality of SPs a service demand and a normalized precoding matrix, $W^m$, the normalized precoding matrix $W^m$ being determined by the corresponding SP based at least in part on the corresponding set of channel information $H^m$. The network node also includes processing circuitry in communication with the network node, the processing circuitry configured to: allocate a virtual transmit power $\alpha^m P^w$ to each of the plurality of SPs based at least in part on the received service demands and normalized precoding matrices, $W^m$; and determine a downlink precoding matrix, V, to transmit messages to WDs, the downlink precoder matrix V being based at least in part on the received service demands and normalized precoding matrices, $W^m$.

According to this aspect, in some embodiments, the virtual transmit power allocations are determined that provide a specified balance between interference suppression/virtualization demand attainment and achieving a specified performance. In some embodiments, providing the specified balance is based at least in part on allocation of a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\sum_{m \in M} \alpha_c^m = 1$, and $P_c^{max}$ a maximum transmit power limit on the BS in cell c. In some embodiments, the processing circuitry is further configured to coordinate C cells at a beamforming level to determine the downlink precoding matrix V to meet a virtualization demand D based at least in part on the received service demands from the SPs. In some embodiments, the determination of a downlink precoding matrix, V is based at least in part on a leakage function and a precoding deviation function. In some embodiments, the downlink precoding matrix, V is based at least in part on minimization of a weighted sum of leakage and precoding deviation subject to per-cell maximum transmit power constraints. In some embodiments, the downlink precoding matrix, V is based at least in part on minimization of a leakage subject to per cell precoding deviation and maximum transmit power constraints. In some embodiments, the downlink precoding matrix V is based at least in part on minimization of a precoding deviation subject to per-cell leakage and maximum transmit power constraints. In some embodiments, the processing circuitry is further configured to base the allocation of virtual transmit power $\alpha^m P^w$ on the received normalized precoding matrices, $W^m$, without exchange of channel state information (CSI) or transmit coordination across cells served by the network node.

According to another aspect, a method implemented in a network node in communication with a plurality of service providers (SPs) and wireless devices (WDs). Is provided. The method includes, in each of a plurality of successive transmission time periods: transmitting to each of a plurality of SPs m a corresponding set of channel information, $H^m$; receiving from each of the plurality of SPs a service demand and a normalized precoding matrix, $W^m$, the normalized precoding matrix $W^m$ being determined by the corresponding SP based at least in part on the corresponding set of channel information $H^m$; allocating a virtual transmit power $\alpha_c^m P^w$ to each of the plurality of SPs based at least in part on the received service demands and normalized precoding matrices, $W^m$; and determining a downlink precoding matrix, V, to transmit messages to WDs, the precoder matrix V being based at least in part on the received service demands and normalized precoding matrices, $W^m$.

According to this aspect, in some embodiments, the allocating of virtual transmit powers is based at least in part on attaining a specified balance between interference suppression/virtualization demand and achieving a specified performance. In some embodiments, the specified balance is based at least in part on allocating a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\sum_{m \in \mathcal{M}} \alpha_c^m = 1$, and $P_c^{max}$ a maximum transmit power limit on the BS in cell c. In some embodiments, the method further includes coordinating C cells at a beamforming level to determine the downlink precoding matrix V to meet a virtualization demand D based at least in part on the received service demands from the SPs. In some embodiments, the determination of a downlink precoding matrix, V is based at least in part on a leakage function and a precoding deviation function. In some embodiments, the downlink precoding matrix, V is based at least in part on minimization of a weighted sum of leakage and precoding deviation subject to per-cell maximum transmit power constraints. In some embodiments, the downlink precoding matrix, V is based at least in part on minimization of a leakage subject to per cell precoding deviation and maximum transmit power constraints. In some embodiments, the downlink precoding matrix V is based at least in part on minimization of a precoding deviation subject to per-cell leakage and maximum transmit power constraints. In some embodiments, the method further includes basing the allocation of virtual transmit power $\alpha_c^m P^w$ on the received normalized precoding matrices, $W^m$, without exchange of channel state information (CSI) or transmit coordination across cells served by the network node.

According to yet another aspect, a network node includes a radio interface configured to: receive channel information, $H^m$, from an infrastructure provider, InP; transmit a service demand and a normalized precoding matrix, $W^m$, to the InP; and receive a downlink precoding matrix, V, from the InP to transmit messages to WDs, the downlink precoder matrix V being based at least in part on service demands and normalized precoding matrices, W, of a plurality of service providers. The network node also includes processing circuitry in communication with the radio interface, the processing circuitry configured to: determine the normalized precoding matrix, $W^m$, based at least in part on the received channel information $H^m$; and apply the downlink precoder matrix V, to downlink transmissions of the network node to a plurality of wireless devices, WDs.

According to another aspect, a method in a network node includes receiving channel information, $H^m$, from an infrastructure provider, InP; determining a normalized precoding matrix, $W^m$, based at least in part on the received channel information $H^m$; transmitting a service demand and a normalized precoding matrix, $W^m$, to the InP; receiving a downlink precoding matrix, V, from the InP to transmit messages to WDs, the downlink precoder matrix V being based at least in part on service demands and normalized precoding matrices, W, of a plurality of service providers;

and applying the downlink precoder matrix V, to downlink transmissions of the network node to a plurality of wireless devices, WDs.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
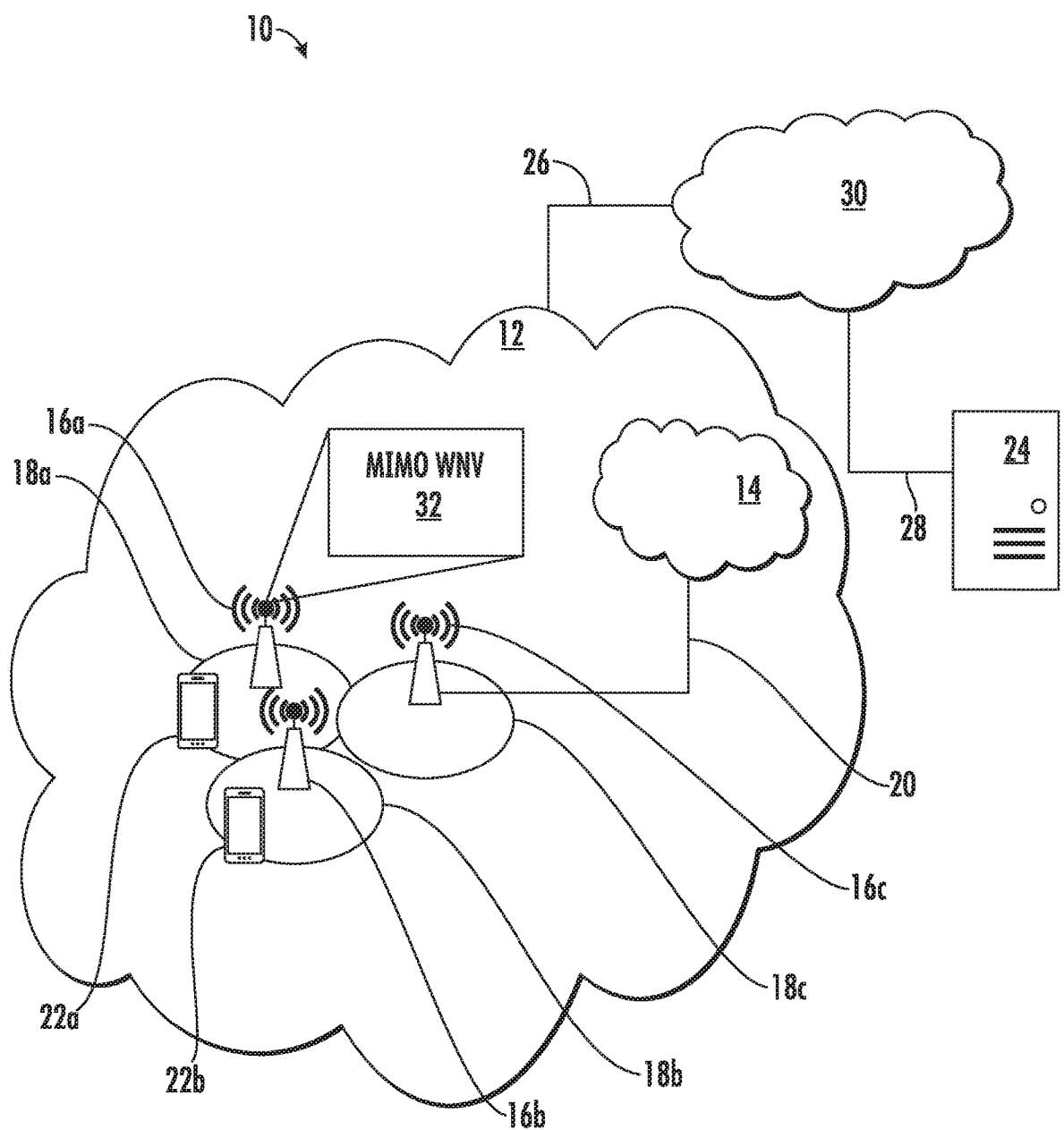
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to distributed coordinated downlink precoding for multi-cell multiple input multiple output (MIMO) wireless network virtualization.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide distributed coordinated downlink precoding for multi-cell multiple input multiple output (MIMO) wireless network virtualization. In some embodiments, in each of a plurality of successive transmission time periods: processing circuitry and/or a radio interface of a network node, is configured to: transmit to each of a plurality of SPs m a corresponding set of channel information, $H^m$; receive from each of the plurality of SPs a service demand and a normalized precoding matrix, $W^m$, the normalized precoding matrix $W^m$ being determined by the corresponding SP based on the corresponding set of channel information $H^m$; allocate a virtual transmit power $\alpha^m P^w$ to each of the plurality of SPs based at least in part on the received service demands and normalized precoding matrices, $W^m$; and determine a downlink precoding matrix, V, to transmit messages to WDs, the downlink precoder matrix V being based at least in part on the received service demands and normalized precoding matrices, $W^m$.

Figure 2:
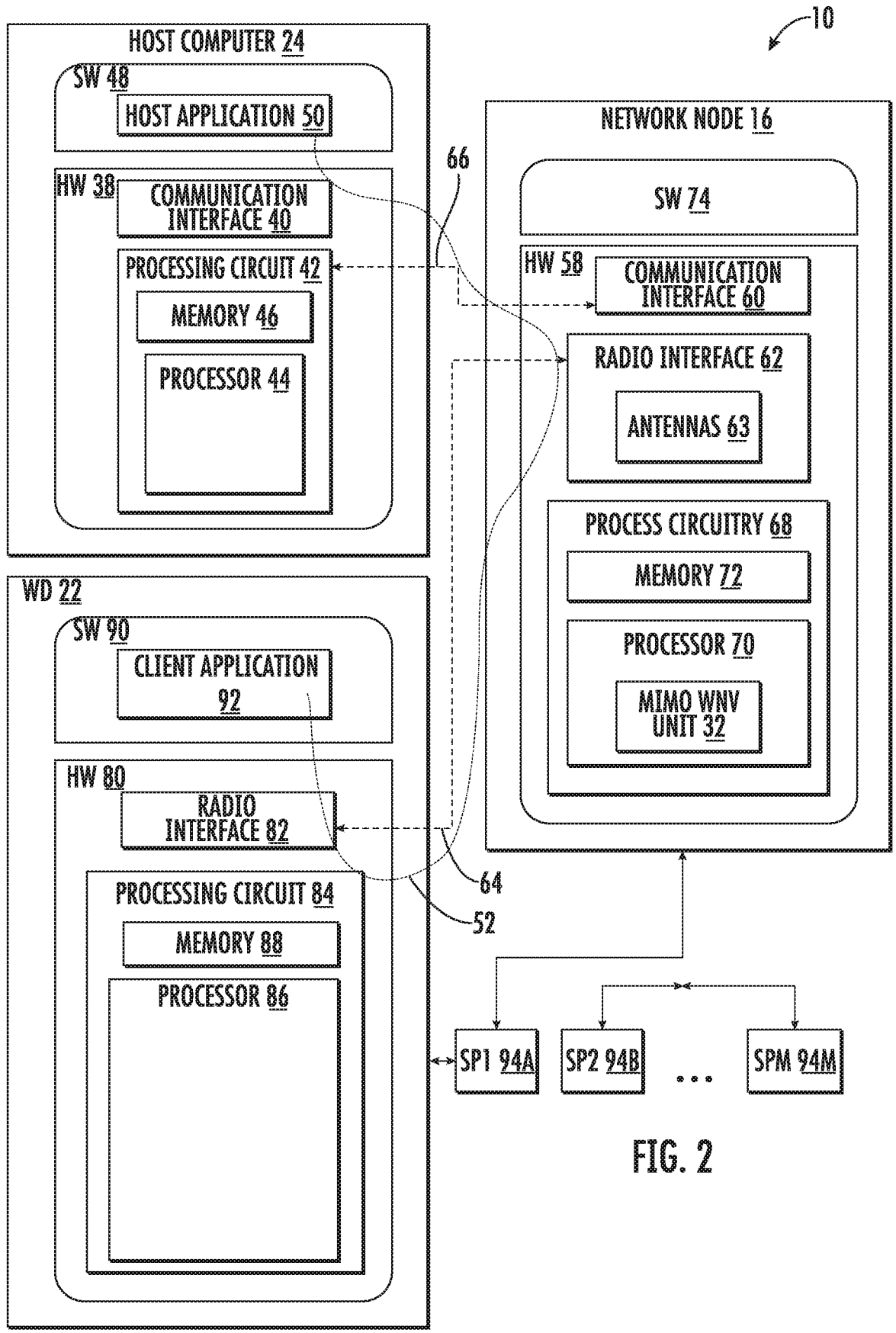
FIG. 2 is a block diagram of a host computer communicating via a network node with a wireless device over an at least partially wireless connection according to some embodiments of the present disclosure.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. Note further that, for ease of understanding some network nodes 16, such as network node 16a and/or network node 16a, for example, may be virtual instantiations of a network node 16 allocated to service providers SPs 94A, 94B . . . 94M as shown in FIG. 2, whereas network node 16c may be the actual infrastructure provider node. i.e., the physical hardware that is shared among SPs 94. The SPs 94 may be implemented as a virtual/shared LTE or 5G network node, for example, as may be provided by an InP.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16c is configured to include a MIMO WNV unit 32 which is configured to allocate a virtual transmit power $\alpha^m P^w$ to each of the plurality of SPs, each SP configured to serve a plurality of WDs 22, based at least in part on received service demands and normalized precoding matrices, $W^m$, and determine a downlink precoding matrix, V, to transmit messages to WDs, the downlink precoder matrix V being based at least in part on the received service demands and normalized precoding matrices, $W^m$. Thus, in FIG. 1, the network node 16c may perform wireless network virtualization for multiple service providers, which could themselves, share base station hardware such as shown as network nodes 16a and 16b. In other words, network node 16c is an example of a physical base station provided by an InP, whose hardware is shared among multiple SPs. Thus, network nodes 16a and 16b may be assigned to various SPs and refer to a virtual/logical portion of the shared physical resources of a network node 16, such as a network node 16c.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The radio interface 62 includes antennas 63 for communication with the SPs 94 and WDs 22. The communication interface 60 may be configured to facilitate a connection 66 to the host computer 24. The connection 66 may be direct or it may pass through a core network 14 of the communication system 10 and/or through one or more intermediate networks 30 outside the communication system 10. In some embodiments, the SPs 94 functionality is implemented as shared network nodes 16a, 16b, and more network nodes 16, not shown in FIG. 1.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include MIMO WNV unit 32 which is configured to allocate a virtual transmit power $\alpha^m P^w$ to each of the plurality of SPs 94 based at least in part on received service demands and normalized precoding matrices, $W^m$, and determine a downlink precoding matrix, V, to transmit messages to WDs, the downlink precoder matrix V being based at least in part on the received service demands and normalized precoding matrices, $W^m$.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as MIMO WNV unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
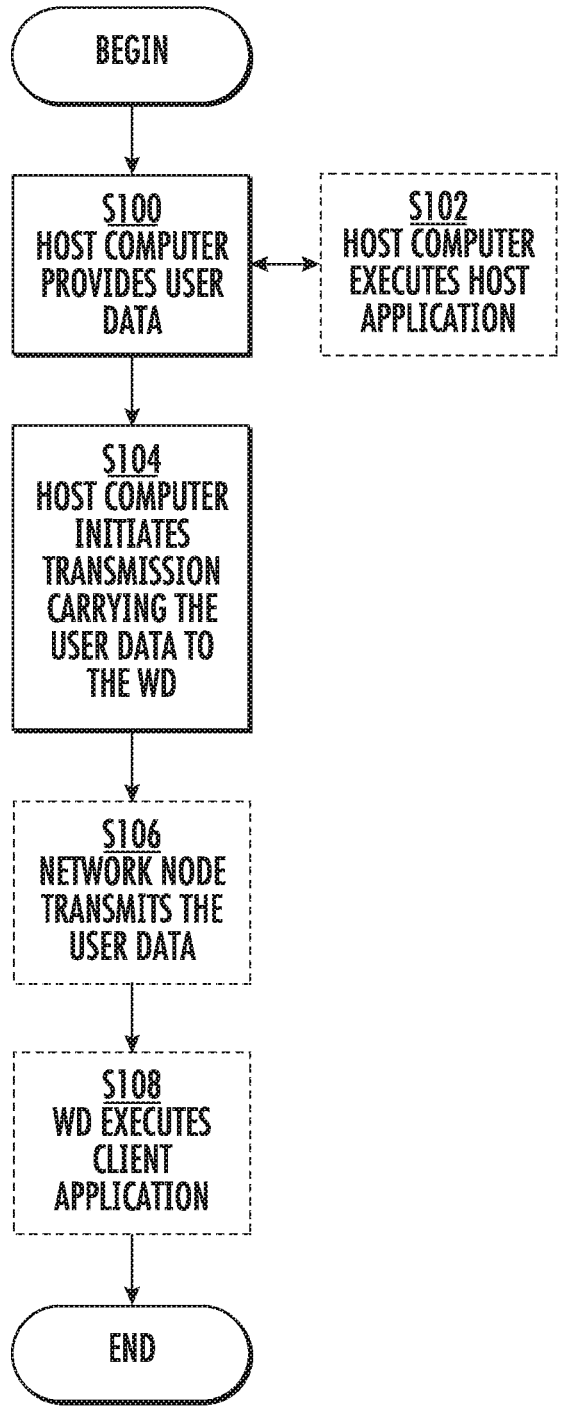
FIG. 3 is a flowchart illustrating example methods implemented in a communication system including a host computer, a network node and a wireless device for executing a client application at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 4:
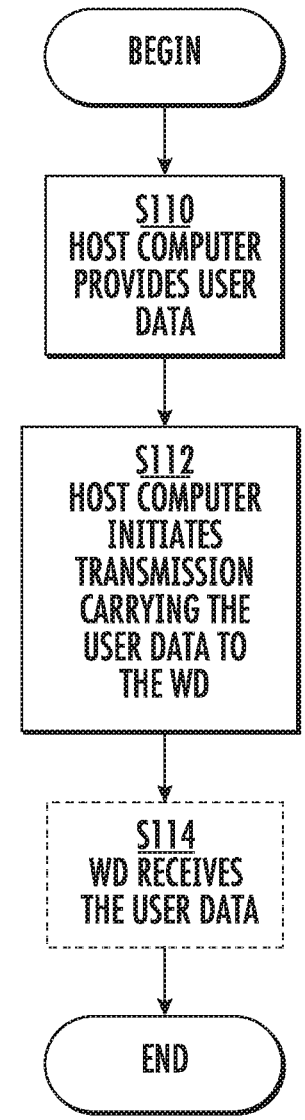
FIG. 4 is a flowchart illustrating example methods implemented in a communication system including a host computer, a network node and a wireless device for receiving user data at a wireless device according to some embodiments of the present disclosure.

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
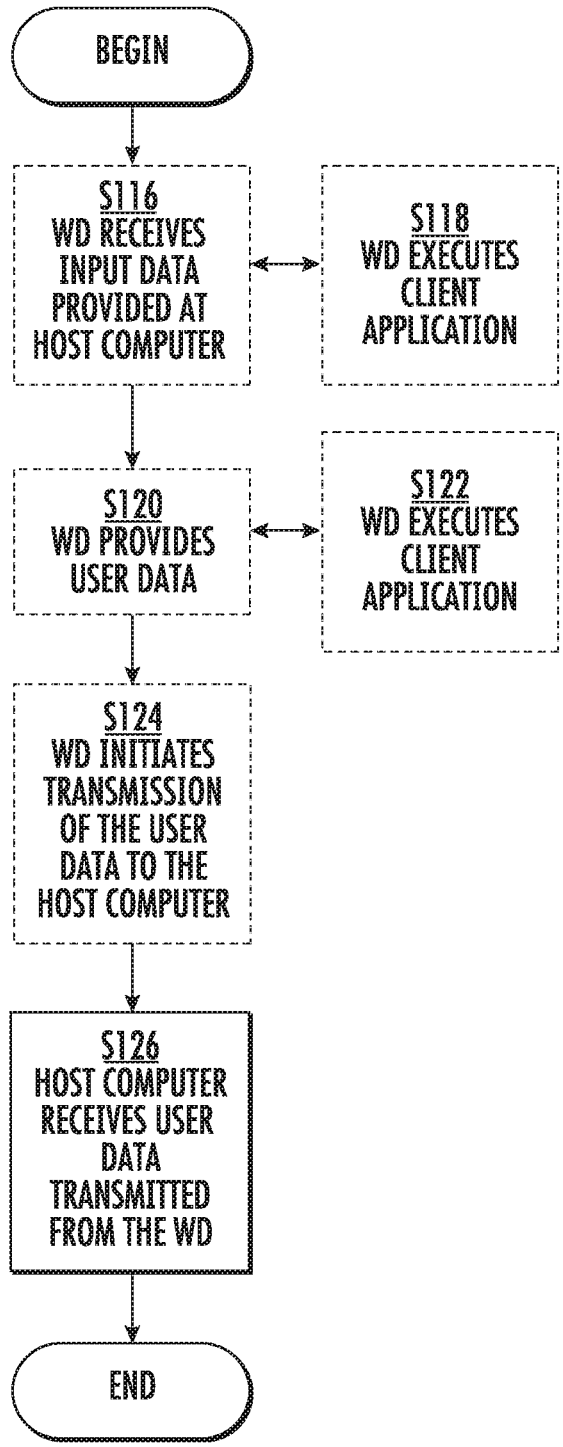
FIG. 5 is a flowchart illustrating example methods implemented in a communication system including a host computer, a network node and a wireless device for receiving user data from the wireless device at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
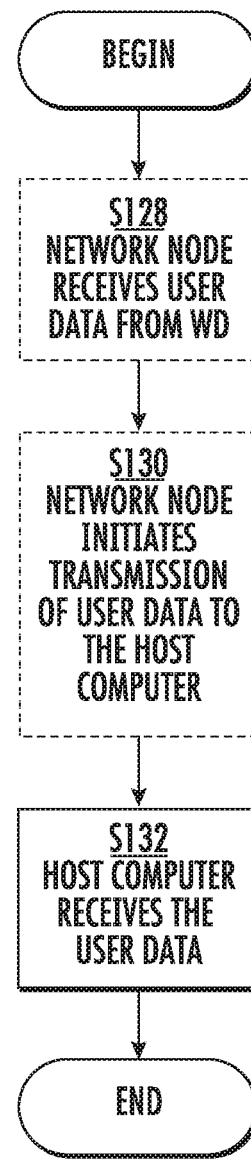
FIG. 6 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
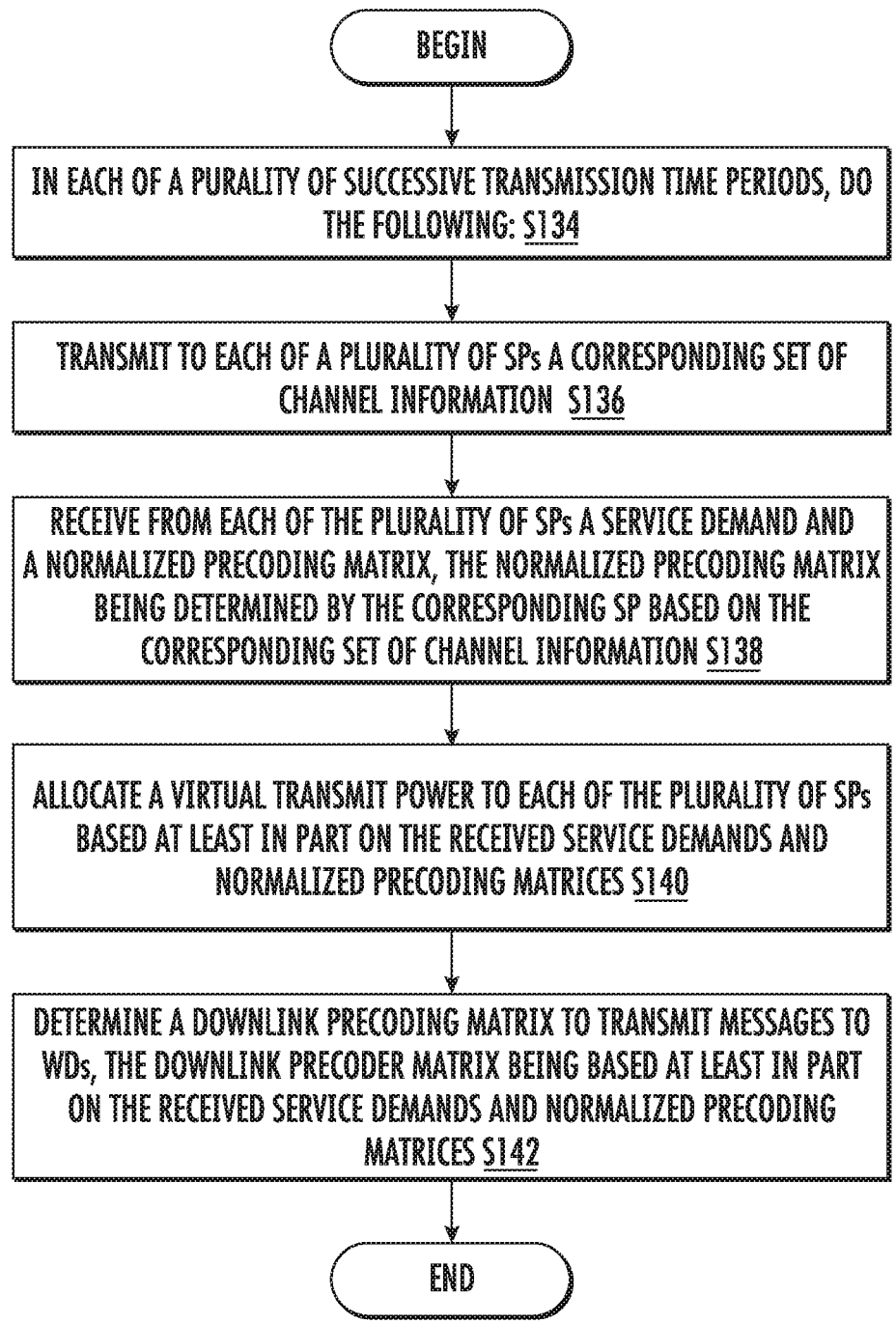
FIG. 7 is a flowchart of an example process in a network node for distributed coordinated downlink precoding for multi-cell multiple input multiple output (MIMO) wireless network virtualization (WNV) according to principles disclosed herein.

FIG. 7 is a flowchart of an example process in a network node 16c for distributed coordinated downlink precoding for multi-cell multiple input multiple output (MIMO) wireless network virtualization (WNV) according to principles disclosed herein. One or more blocks described herein may be performed by one or more elements of network node 16c such as by one or more of processing circuitry 68 (including the MIMO WNV unit 32), processor 70, radio interface 62 and/or communication interface 60. c 16 such as via processing circuitry 68 and/or processor 70 and/or radio interface 62 and/or communication interface 60 is configured to, for each of a plurality of successive transmission periods (Block S134): transmit to each of a plurality of SPs 94 $m$ a corresponding set of channel information, $H^m$ (Block S136); receive from each of the plurality of SPs 94 $a$ service demand and a normalized precoding matrix, $W^m$, the normalized precoding matrix $W^m$ being determined by the corresponding SP based on the corresponding set of channel information $H^m$ (Block S138); allocate a virtual transmit power $\alpha^m P^w$ to each of the plurality of SPs 94 based at least in part on the received service demands and normalized precoding matrices, $W^m$ (Block S140); and determine a downlink precoding matrix, V, to transmit messages to WDs, the precoder matrix V being based at least in part on the received service demands and normalized precoding matrices, $W^m$ (Block S142).

Figure 8:
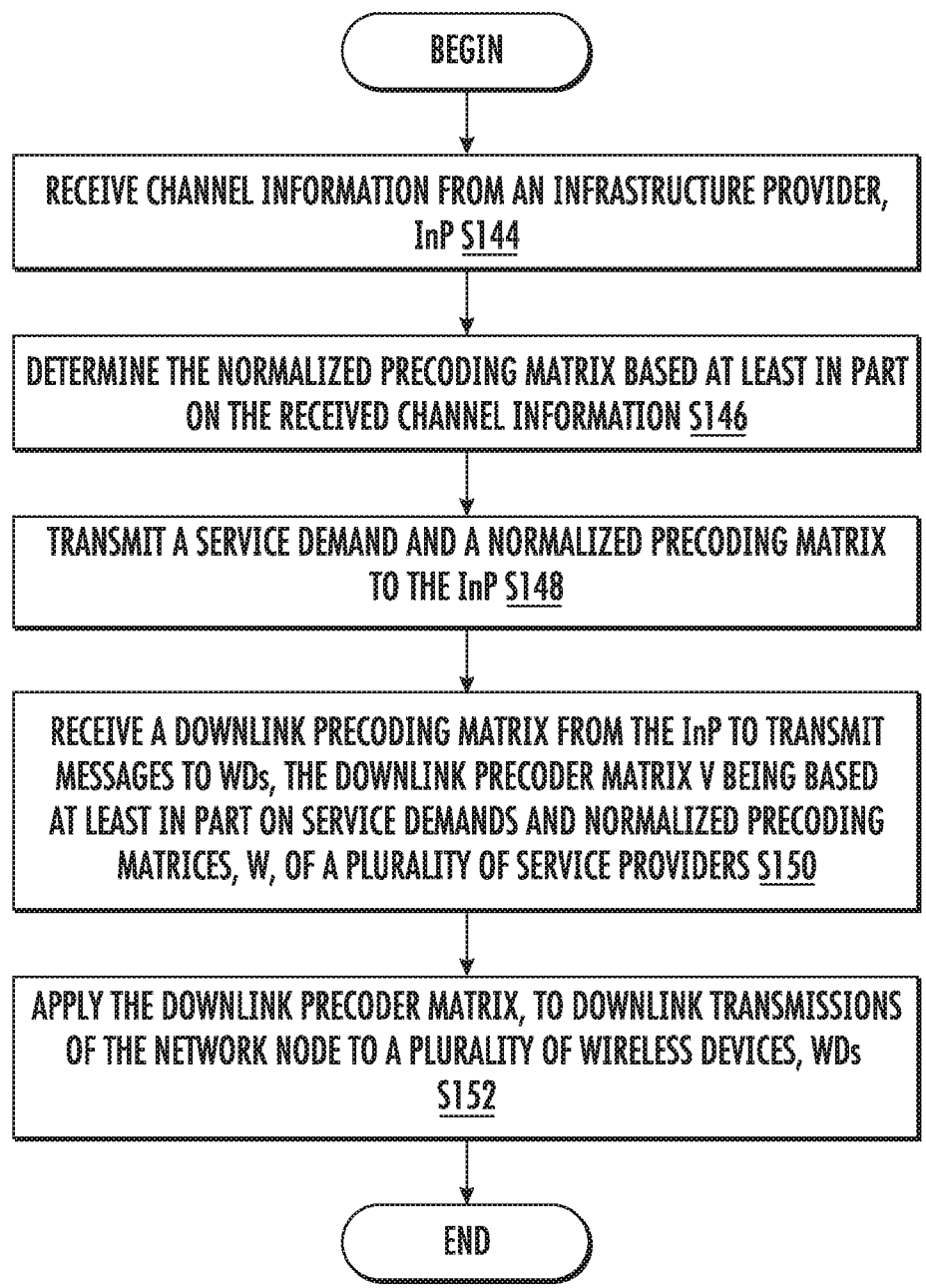
FIG. 8 is a flowchart of an example process in a network node according to principles disclosed herein.

FIG. 8 is a flowchart of an example process in a network node configured according to principles disclosed herein. One or more blocks described herein may be performed by one or more elements of network node 16c such as by one or more of processing circuitry 68 (including the MIMO WNV unit 32), processor 70, radio interface 62 and/or communication interface 60. c 16 such as via processing circuitry 68 and/or processor 70 and/or radio interface 62 and/or communication interface 60 is configured to receive channel information, $H^m$, from an infrastructure provider, InP (Block S144). The process also includes determining a normalized precoding matrix, $W^m$, based at least in part on the received channel information $H^m$ (Block S146). The process further includes transmitting a service demand and a normalized precoding matrix, $W^m$, to the InP (Block S148). The process further includes receiving a downlink precoding matrix, V, from the InP to transmit messages to WDs, the downlink precoder matrix V being based at least in part on service demands and normalized precoding matrices, W, of a plurality of service providers (Block S150). The process also includes applying the downlink precoder matrix V, to downlink transmissions of the network node to a plurality of wireless devices, WDs (Block S152).

Having described the general process flow of arrangements of the disclosure and having provided examples of hardware and software arrangements for implementing the processes and functions of the disclosure, the sections below provide details and examples of arrangements for distributed coordinated downlink precoding for multi-cell multiple input multiple output (MIMO) wireless network virtualization.

Embodiment #1: Single-Cell MIMO WNV

In a first embodiment, a solution for the single-cell use case is defined. This embodiment applies to a virtualized wireless network with an InP that owns and operates the physical network infrastructure (including the network node 16c), and multiple SPs 94, which are responsible for the services of their subscribing users. It is assumed that the network node 16c of the InP is further responsible for executing virtualization. A user is served by only one SP at any time. The subscription of users to SPs 94 may be predetermined.

Precoding Design by InP and SPs

To illustrate the spatial service isolation approach, first consider the downlink in each cell of a cellular network owned by the InP. Assume that the network node 16c (also referred to as a base station) has N antennas, and that there are M SPs 94 that share the antenna hardware, wireless spectrum, and transmission power provided by the InP.

Each SP designs its desirable precoding matrix for its own users, which is sent to the InP network node 16c as virtualization service demand. For $m \in \mathcal{M} \triangleq \{1, \ldots, M\}$, denote $K^m$ the number of users of SP m. There is a total of $K=\sum_{m\in\mathcal{M}} K^m$ users in the cell. The InP network node 16c shares with each SP m the flat fading channel of its users from all N antennas at the BS 16c $H^m \in \mathbb{C}^{K^m \times N}$, and each SP m then uses all the antennas to design its normalized demanded precoding matrix $W^m \in \mathbb{C}^{N \times K^m}$ such that $\|W^m\|_F^2 = 1$. The proposed method can accommodate any demanded precoding matrices. For example, normalized zero forcing (ZF) precoding may be used by any SP to guarantee fairness of its users.

The InP is responsible for virtualizing the network node 16c in a manner that is transparent to the SPs 94 and their users. This means that it designs a new precoding matrix, $V \in \mathbb{C}^{N \times K}$, based on the demanded precoding matrices $W^m$ from the SPs 94, such that the users of SP m receive signals that reflect the SP's demand, despite the fact that SP m is unaware of the interfering SPs 94. It is worth noting that the InP network node 16c cannot use a simple aggregation of the precoding matrices designed by the SPs 94, since that would lead to severe inter-SP interference Past studies have adopted a spatial virtualization approach to allocate full transmit power to the SPs 94 for their demanded precoding design. Since the SPs 94 do not consider the inter-SP interference, this can lead to a demanded system performance from the SPs 94 that cannot be satisfied by the InP network node 16c. As a result, the InP network node 16c will have limited precoding space for interference control, which may lead to system performance deterioration. In contrast, in some embodiments disclosed herein, a more flexible solution is based on the notion of a virtual transmit power allocation at the InP network node 16c. After collecting all the normalize demanded precoding matrices $W^m$ from the SPs 94, the InP network node 16c allocates a virtual transmit power $\alpha^m P^w$ to each SP m, where $P^w \leq P^{max}$ is the total virtual transmit power allocated to the SPs 94, $\alpha^m$ is a virtual transmit power allocation factor such that $\sum_{m \in \mathcal{M}} \alpha^m = 1$. The SP priority, user density, bidding, and so on can be reflected in the virtual transmit power allocation factor. Through the virtual transmit power allocation, interference suppression and satisfying the virtualization demand can be balanced at the InP network node 16c to achieve certain desired system performance.

An overview of the overall operation of the virtualized wireless network is as follows. In the time domain, transmissions are divided into defined periods, which can be permanent or dynamic on a frame or sub-frame basis. In each transmission period, firstly, to each SP m, the InP network node 16c communicates the corresponding channel information $H^m$. Then, the SPs 94 design the normalized precoding matrices $W^m$ for their users and communicate them to the InP network node 16c as service demands. Finally, the InP collects all $W^m$, allocates a virtual transmit power $\alpha^m P^w$ to each SP m, and then designs precoding matrix V to transmit all users' messages.

Figure 9:
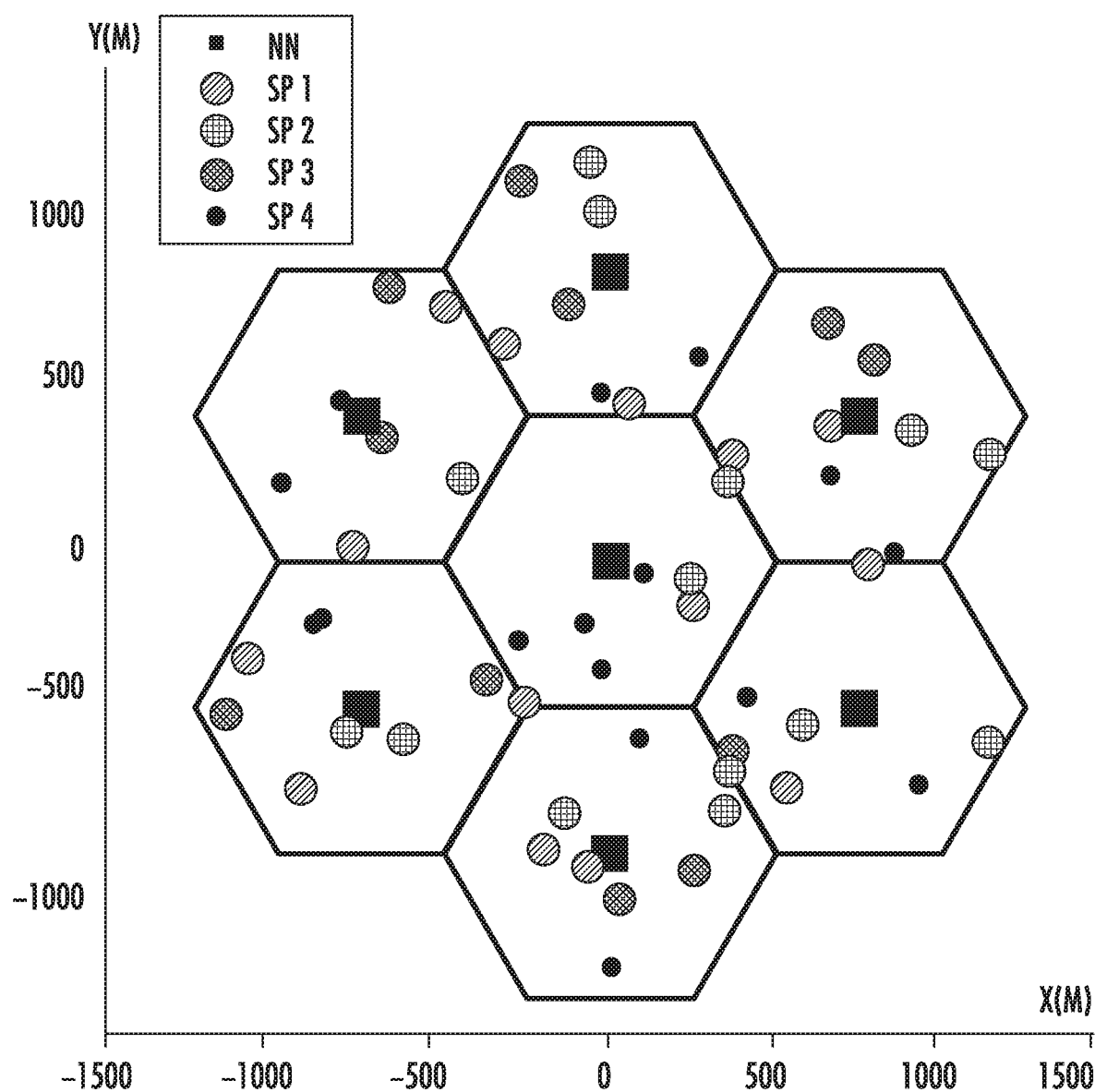
FIG. 9 is an example realization of coordinated multi-cell MIMO WNV with one infrastructure provider (InP)-owned network node serving four service providers (SPs)
Figure 10:
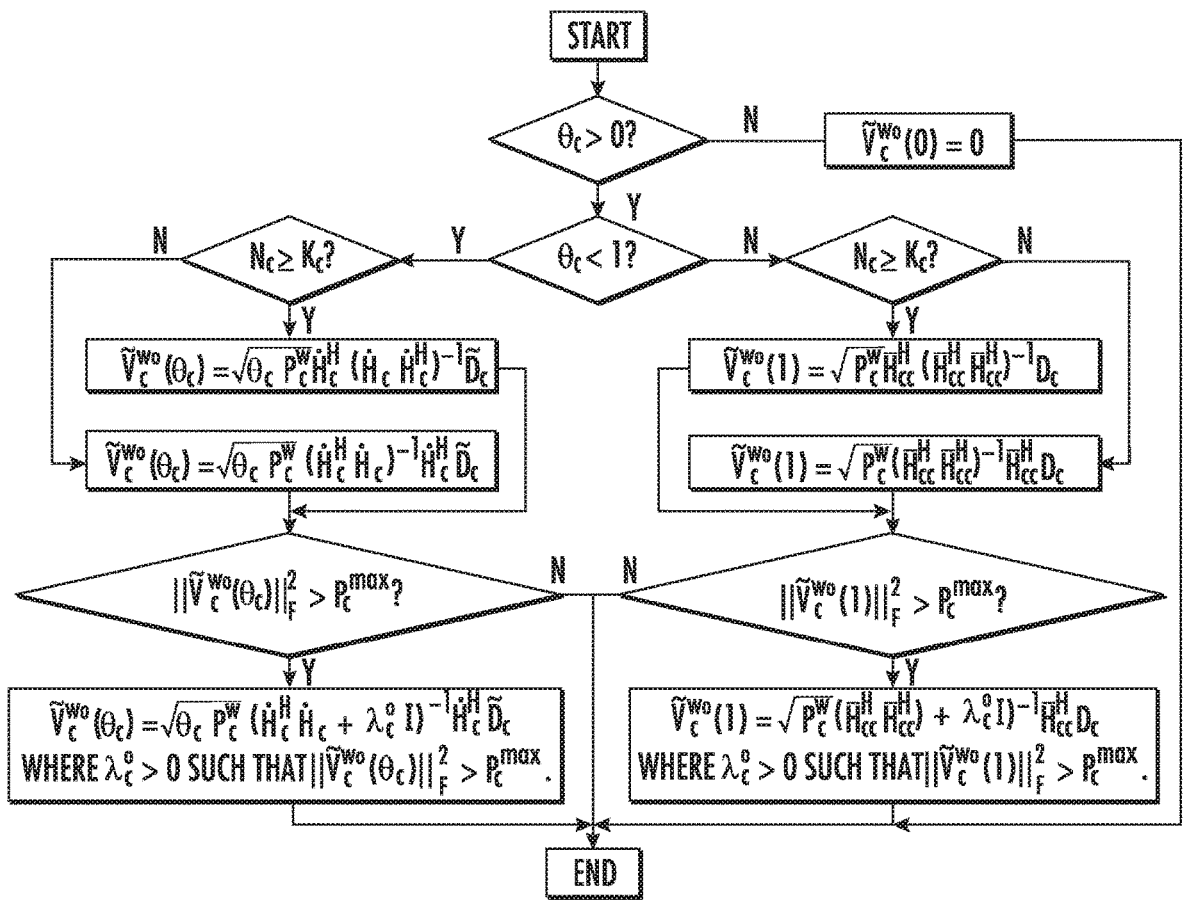
FIG. 10 is a flowchart of an example algorithm according to principles set forth herein.
Figure 11:
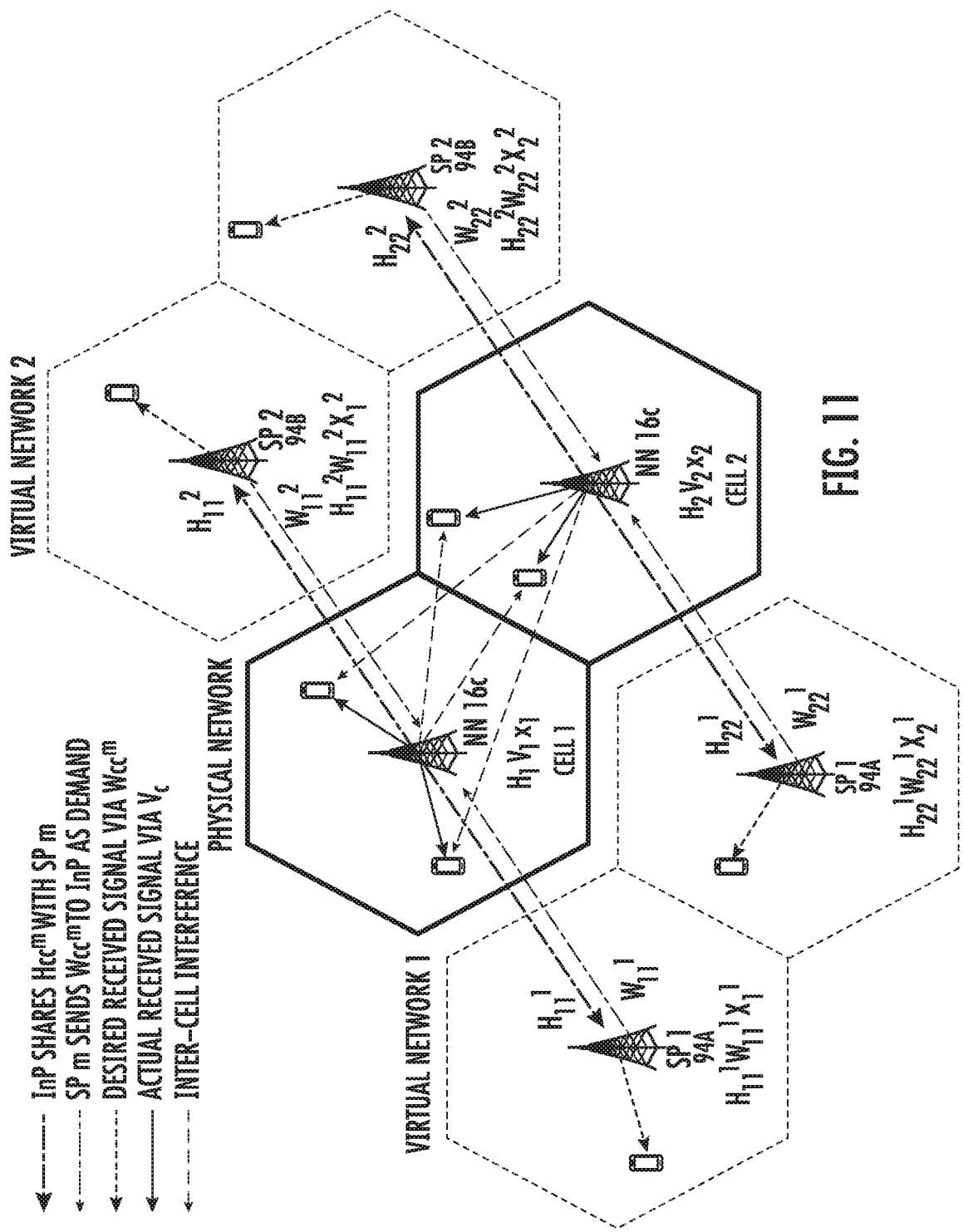
FIG. 11 illustrates an example of coordinated MIMO WNV in a network with one InP and two SPs, each SP serving its own users in a virtual network.

Note that the above described physical and virtual functionality of the InP network node 16c and SPs 94 as illustrated in the context of FIGS. 9, 10 and 11, can, without loss of generality, all be implemented in a single wireless network node 16c such as an 3GPP Evolved Universal Terrestrial Radio Access (EUTRA) eNB or a 3GPP NR gNB (base station). Of note, the SP indications in FIG. 9, e.g., SP 1, SP 2, SP 3 and SP 4, refer to the WDs 22 supported by the SP, and are not the actual network nodes 16. The network node (NN) 16 that supports the various SPs and ultimately the WDs corresponding to each SP is shown as a square in the center of each cell.

Minimization of Precoding Deviation

Let $x^m \in \mathbb{C}^{K^m \times 1}$ represent the downlink messages for the users of SP m, and define $x \triangleq [x^{1H}, \ldots x^{MH}]^H$. Without loss of generality, assume that the messages are zero-mean, uncorrelated, and normalized, i.e., $\mathbb{E}\{x\}=0$ and $\mathbb{E}\{xx^H\}=I$. Let $V \triangleq [V^1, \ldots, V^M]$ be the precoding matrix designed by the InP 16c, where $V^m \in \mathbb{C}^{N \times K^m}$ corresponds to the precoding for the users of SP m. Then, the actual received signal at the $K^m$ users of SP m is:

$$y^m = H^m V^m x^m + \sum_{i \in \mathcal{M}, i \neq m} H^m V^i x^i.$$

Note that the second part of the above sum represents the inter-SP interference to the users of SP m, from the signals intended for the users of the other SPs 94. The actual received signal vector $y \triangleq [y^{1H}, \ldots, y^{MH}]^H$ at all K users in the cell is:

$$y = HVx$$

where $H \triangleq [H^{1H}, \ldots, H^{MH}]^H$ is the global channel state.

The precoding matrix V should be designed in a way that the actual received signal $y^m$ reflects the demand of SP m. With $W^m$ and $\alpha^m P^w$, the virtual received signal based on the service needs of SP m is:

$$\tilde{y}^m = \sqrt{\alpha^m P^w} H^m W^m x^m.$$

Define $\tilde{y} \triangleq [\tilde{y}^{1H}, \ldots, \tilde{y}^{MH}]^H$ as the virtual received signals at all K users in the cell, then:

$$\tilde{y} = \sqrt{P^w} Dx$$

where $D \triangleq \text{blkdiag}\{\sqrt{\alpha^1} H^1 W^1, \ldots, \sqrt{\alpha^M} H^M W^M\}$ can be viewed as the virtualization demand from the SPs 94.

The expected deviation of the actual received signal from the virtual received signal at all K users in the network is given by:

$$\mathbb{E}\{\|y - \tilde{y}\|_F^2\} = \mathbb{E}\{\|HV - \sqrt{P^w} D\|_F^2\}.$$

Therefore, define the precoding deviation between the precoding by the InP network node 16c and the SPs 94' demanded precoding as:

$$\rho(V) \triangleq \|HV - \sqrt{P^w} D\|_F^2$$

in which the virtual transmit power $P^w$ balances the inter-SP interference and virtualization demand. Observe that the system performance is closely related to the precoding deviation $\rho(V)$.

For the single-cell case, a method to minimize the precoding deviation subject to the maximum transmit power limit to achieve certain desired system performance is as follows:

$$\mathcal{P}: \min_{V} \rho(V) \quad (1)$$
$$\text{s.t.} \quad g(V) \leq 0$$

where $$g(V) \triangleq \|V\|_F^2 - P^{max}$$

is the maximum transmit power constraint function. The virtual transmit power $P^w$ serves as a tuning parameter in $\rho(V)$ that trade off interference control and satisfaction of virtualization demand to reach certain desired system performance.

Semi-Closed-Form Precoding Solution

Even though the single-cell case is idealistic, the problem of precoding deviation minimization admits of an interesting semi-closed-form precoding solution. Consider this case here as a prelude to a coordinated precoding solution to the multi-cell case in the next section. Some of the results in this section will be reused in the next section.

First, it is shown how to solve the deviation minimization problem $\mathcal{P}^w$ to obtain an optimal precoding solution $V^\circ$ at the InP network node 16c with any given virtual power $P^w \leq P^{max}$. Note that $\mathcal{P}^w$ is a convex problem with strong duality. Instead of using an existing numerical solver on this problem, a more efficient semi-closed-form solution is disclosed as follows.

For any Lagrange multiplier $\lambda \geq 0$, the Lagrange function for $\mathcal{P}^w$ is $$\mathcal{L} = \rho(V) + \lambda g(V).$$

Taking partial derivative with respect to $V^*$ (the complex conjugate of $V$), yields:

$$\nabla_{V^*} \mathcal{L} = H^H(HV - \sqrt{P^w}D) + \lambda V. \qquad (2)$$

The Karush-Kuhn-Tucker (KKT) conditions for $(V^\circ, \lambda^\circ)$ being globally optimal are given by:

$$(H^H H + \lambda^\circ I)V^\circ = \sqrt{P^w} H^H D, \qquad (3)$$

$$\|V^\circ\|_F^2 - P^{max} \leq 0, \qquad (4)$$

$$\lambda^\circ \geq 0, \qquad (5)$$

$$\lambda^\circ (\|V^\circ\|_F^2 - P^{max}) = 0 \qquad (6)$$

where (3) follows from setting $\nabla_{V^*} \mathcal{L}$ in (2) to 0.

An optimal solution based on (3)-(6) is provided in the following cases.

$\lambda^\circ = 0$: From (3), the optimal solution must satisfy:

$$H^H H V^\circ = \sqrt{P^w} H^H D. \qquad (7)$$

Equation (7) may be classified in three subcases: 1.i) If $N > K$: $H^H H \in \mathbb{C}^{N \times N}$ is a rank deficient matrix, and there are infinitely many solutions for $V^\circ$. $V^\circ$ may be chosen to minimize $\|V^\circ\|_F^2$ subject to (7), which is an under-determined least square problem with a closed-form solution:

$$V^\circ = \sqrt{P^w} H^H (HH^H)^{-1} D. \qquad (8)$$

By (4), if $P^w \|H^H(HH^H)^{-1}D\|_F^2 \leq P^{max}$, then $V^\circ$ in (8) is the optimal solution. 1.ii) If $N = K$: the unique solution for $V^\circ$ is given by:

$$V^\circ = \sqrt{P^w} H^{-1} D.$$

which is a special case of (8). 1.iii) If $N < K$: $H^H H \in \mathbb{C}^{N \times N}$ is of full rank, and a unique solution for $V^\circ$ is given by:

$$V^\circ = \sqrt{P^w} (H^H H)^{-1} H^H D. \qquad (9)$$

Again, if $P^w \|(H^H H)^{-1} H^H D\|_F^2 \leq P^{max}$, then $V^\circ$ in (9) is the optimal solution. For all three subcases 1.i), 1.ii), and 1.iii), $V^\circ$ in (8) or (9) cannot satisfy (4), which means the condition in Case 1) does not hold at optimality, i.e., $\lambda^\circ > 0$, and the optimal solution is discussed in Case 2) as follows.

$\lambda^\circ > 0$: From (3), $H^H H + \lambda^\circ I > 0$, which implies that (9) is invertible, and:

$$V^\circ = \sqrt{P^w} (H^H H + \lambda^\circ I)^{-1} H^H D. \qquad (10)$$

By (6), $V^\circ$ in (10) is the optimal solution where $\lambda^\circ > 0$ such that $P^w \|(H^H H + \lambda^\circ I)^{-1} H^H D\|_F^2 = P^{max}$. The following lemma shows that $\lambda^\circ > 0$ in (10) can be easily found by bisection search.

Lemma 1. There exists a Lagrangian multiplier $\lambda^\circ \in (0, B$ $$\sqrt{\frac{NP^w}{P^{max}}}]$$

for $V^\circ$ in (10) such that $\|V^\circ\|_F^2 = P^{max}$, where $B = \|H\|_F^2$.

Virtual Transmit Power Allocation

The virtual transmit power $P^w$ balances interference suppression and the satisfaction of virtualization demand in the objective of $\mathcal{P}$ to achieve a certain desired system performance. However, the search space of $P^w$ for a certain desired system performance could be very large. Therefore, a closed-form virtual transmit power allocation scheme to simplify the tedious searching process is disclosed herein. For the averaged minimum rates of the SPs 94 that may be used as a system performance metric, this virtual transmit power allocation strategy achieves a system performance that is close to optimum.

In the idealized case that the actual precoding matrix $V$ designed by the InP network node 16c has no precoding deviation, i.e., $\rho(V) = 0$, $V$ should satisfy:

$$HV - \sqrt{P^w} = 0 \qquad (11)$$

and the maximum transmit power constraint in (1). Note that $H \in \mathbb{C}^{K \times N}$ and there are the following cases.

1) $N \geq K$: The solution to (11) while minimizing $\|V\|_F^2$ is given in (8). A unique observation disclosed herein is that the virtual transmit power $P^w$ in (8) can be seen as a power regularization factor to satisfy the maximum transmit power constraint. The maximum virtual transmit power $P^w$, such that $V^\circ$ in (8) satisfies (1), is given by $$P^{w\circ} = \frac{P^{max}}{\|H^H(HH^H)^{-1}D\|_F^2} \qquad (12)$$

In this case, the precoding solution $V^\circ$ in (8) with the virtual transmit power $P^{w\circ}$ in (12) nulls the inter-SP interference, and perfectly meets the virtualization demand from the SPs 94 with the maximum transmit power.

2) $N < K$: Since (11) is an over-determined equation system, there is usually no precoding solution that generates zero precoding deviation. The precoding solution that minimizes the precoding deviation $\|HV - \sqrt{P^w}D\|_F^2$ is given in (9). The maximum virtual transmit power $P^w$ can also be reviewed as a power regularization factor. The maximum value of $P^w$, such that $V^\circ$ in (9) satisfies (1), is given by:

$$P^{w\circ} = \frac{P^{max}}{\|(H^H H)^{-1} H^H D\|_F^2} \qquad (13)$$

In this case, the precoding solution $V^\circ$ in (9) with the virtual transmit power $P^{w\circ}$ in (13) minimizes the precoding deviation with the maximum transmit power.

With precoding matrix $V^\circ$ in (8) or (9), the signal to noise plus interference ratio (SINR) of the $k^m$-th user of SP m is given by:

$$SINR_{k^m} = \frac{|[H^m V^{m\circ}]_{k^m, k^m}|^2}{\Sigma_{k^i \in \mathcal{K}^m, k^i \neq k^m} |[H^m V^{m\circ}]_{k^m, k^i}|^2 + \Sigma_{j \in \mathcal{M}, j \neq m} \Sigma_k \, _{j \in \mathcal{K}^j} |[H^m V^{j\circ}]_{k^m, k^j}|^2 + \sigma_n^2}$$

which is monotonically increasing with the virtual transmit power $P^w$, where $\mathcal{K}^m \triangleq \{1, 2, \ldots, K^m\}$. Therefore, the SINRs of users in the cell is maximized in terms of the virtual transmit power $P^{wo}$ in (12) or (13) with $V^o$ in (8) or (9). When the network node (base station, BS 16c) is equipped with $N \geq K$ antennas, and uses $V^o$ in (8) with $P^{wo}$ in (12), there is no inter-SP interference, the virtualization demand from the SPs 94 is perfectly met, while the SINRs of the users in the network is maximized in terms of the virtual transmit power.

Embodiment #2: Multi-Cell Coordinated MIMO WNV

In this embodiment, the single-cell solution is extended to the multi-cell coordinated case in this section. The notion of spatial virtualization, the semi-closed form solution, and virtual transmit power allocation strategy defined in embodiment #1 are extended to the multi-cell case.

Coordinated Spatial Virtualization

Consider an InP that owns a MIMO cellular network that consists of C cells and serves M SPs 94. Let $\mathcal{C} \triangleq \{1, \ldots, C\}$ and $\mathcal{M} \triangleq \{1, \ldots, M\}$. In each cell $c \in \mathcal{C}$, the InP owns the BS 16c equipped with $N_c$ antennas and performs WNV at the BS 16c for data transmission. The SPs 94 are oblivious of each other but share all antennas and wireless spectrum resources provided by the InP network node 16c simultaneously. Each SP $m \in \mathcal{M}$ has $K_c^m$ subscribing users in cell c. There is a total of $K_c = \sum_{m \in \mathcal{M}} K_c^m$ users in cell c, and $K = \sum_{c \in \mathcal{C}} K_c$ users and $N = \sum_{c \in \mathcal{C}} N_c$ antennas in the network.

The single-cell spatial virtualization approach in embodiment #1 is extended to coordinated multi-cell MIMO WNV settings, which is illustrated in FIG. 11. by $HT_{cl}^m \in \mathbb{C}^{K_c^m \times N_l}$ the channel state between the Kr users of SP m in cell c and the BS 16c in cell 1. In each cell c, the InP network node 16c communicates the corresponding channel state:

$$H_{cc}^m$$

with each SP m, which then locally demands its normalized virtual precoding matrix $W_{cc}^m \in \mathbb{C}^{N_c \times K_c^m}$ based on the service needs of the $K_c^m$ users. Note that each SP m designs $W_{cc}^m$ without the need to be aware of the users of other SPs 94 in cell c and all the users in other cells. Therefore, if the InP network node 16c allocates full transmit power to the SPs 94 for their demanded precoding design, the requested system performance from the SPs 94 usually will not be satisfied. This can lead to severe inter-SP and inter-cell interference in the network, which in turn deteriorates the system performance.

Since the data streams for the users of SP m at the other cells $x_l^m, \forall l \in \mathcal{C}, l \neq c$ are not available at BS c, to reduce the amount of information exchange, the InP network node 16c only communicates channel state $H_{cc}^m$ to SP m in cell c as default. However, The InP network node 16c can communicate all or part of the channel state $H_{lc}^m, \forall l \in \mathcal{C}$ to SP m in cell c for its demanded precoding design, especially if SP m requests more CSI from the InP network node 16c. Such variation does not change the design presently being described.

To balance interference suppression and the satisfaction of virtualization demand for certain desired system performance, the InP network node 16c may allocate a virtual transmit power $\alpha_c^m P_c^w$ to SP m in cell c, where $P_c^w \leq P_c^{max}$ is the virtual transmit power allocated to cell c, $\alpha_c^m$ is a virtual transmit power allocation factor such that $\sum_{m \in \mathcal{M}} \alpha_c^m = 1$, and $P_c^{max}$ is the maximum transmit power limit on the BS in cell c. For SP m, with the normalized demanded precoding matrix $W_{cc}^m$ and virtual transmit power $\alpha_c^m P_c^w$, the virtual received signal vector at its $K_c^m$ users in cell c is given by:

$$\tilde{y}_c^m = \sqrt{\alpha_c^m P_c^w} H_{cc}^m W_{cc}^m x_c^m$$

where $x_c^m$ is the transmitted signal vector for the $K_c^m$ users.

Define $\tilde{y}_c \triangleq [\tilde{y}_c^{1H}, \ldots, \tilde{y}_c^{MH}]^H$ as the virtual received signal vector at the $K_c$ users in cell c. Then, $$\tilde{y}_c = \sqrt{P_c^w} D_c x_c$$

where $D_c \triangleq \text{blkdiag}\{\sqrt{\alpha_c^1} H_{cc}^1 W_{cc}^1, \ldots, \sqrt{\alpha_c^M} H_{cc}^M W_{cc}^M\}$ is the normalized virtualization demand from cell c and $x_c \triangleq [x_c^{1H}, \ldots, x_c^{MH}]^H$. Define $\tilde{y} \triangleq [\tilde{y}_1^H, \ldots, \tilde{y}_C^H]^H$ as the virtual received signal vector at all K users in the network. Then, further $$\tilde{y} = Dx$$

where $D \triangleq \text{blkdiag}\{\sqrt{P_1^w} D_1, \ldots, \sqrt{P_C^w} D_C\}$ is the virtualization demand from the network and $x \triangleq [x_1^H, \ldots, x_C^H]^H$, $$y_c^m = H_{cc}^m V_c^m x_c^m + \sum_{j \in \mathcal{M}} H_{cc}^m V_c^i x_c^i + \sum_{l \in \mathcal{C}, l \neq c} \sum_{j \in \mathcal{M}} H_{cl}^m V_l^j x_l^j$$

where the second term is the inter-SP interference from the users of other SPs 94 in cell c, and the third term is the inter-cell interference from all of the users in other cells. The actual received signal vector $y_c \triangleq [y_c^{1H}, \ldots, y_c^{MH}]^H$ all $K_c$ users in cell c is $$y_c = \tilde{H}_{cc} \tilde{V}_c x_c + \sum_{l \in \mathcal{C}, l \neq c} \tilde{H}_{cl} \tilde{V}_l x_l.$$

The actual received signal vector $y \triangleq [y_1^H, \ldots, y_C^H]^H$ at all K users in the network is $$y = HVx$$

where $H \triangleq [\tilde{H}_1, \ldots, \tilde{H}_C] \in \mathbb{C}^{K \times N}$ is the global channel state and $V \triangleq \text{blkdiag}\{\tilde{V}_1, \ldots, \tilde{V}_C\} \in \mathbb{C}^{N \times K}$ is the actual global downlink precoding matrix.

In the multi-cell WNV framework, in each cell c, each SP m locally demands its normalized virtual precoding matrix $W_{cc}^m$ without considering either the inter-SP interference or the inter-cell interference. The InP network node 16c performs virtual transmit power allocation and coordinates the C cells at the beamforming level to design the actual global downlink precoding matrix V to meet the virtualization demand D gathered from the SPs 94, with implicit elimination of both the inter-SP and inter-cell interference. The expected deviation of received signals at all K users in the network, via the InP-designed actual precoding matrix V from that via the SPs 94' virtualization demand D, is given by $$\mathbb{E}\{\|y - \tilde{y}\|_F^2\} = \mathbb{E}\{\sum_{c \in \mathcal{C}} \{\sum_{l \in \mathcal{C}, l \neq c} \|\tilde{H}_{lc} \tilde{V}_c\|_F^2 + \|\tilde{H}_{cc} \tilde{V}_c - \sqrt{P_c^w} D_c\|_F^2\}\} \quad (14)$$

The first term in (14) is the signal leakage from cell c to the other cells defined as $$f_c(\tilde{V}_c) \triangleq \sum_{l \in \mathcal{C}, l \neq c} \|\tilde{H}_{lc} \tilde{V}_c\|_F^2 \quad (15)$$

and the second term in (14) is the precoding deviation of cell c defined as $$\rho_c(\tilde{V}_c) \triangleq \|\tilde{H}_{cc} \tilde{V}_c - \sqrt{P_c^w} D_c\|_F^2. \quad (16)$$

In the idealized case the InP-designed 1 global precoding matrix V generates no leakage from each cell c to the other cells, i.e., $f_c(\tilde{V}_c)=0$, $\forall c \in C$, and has zero precoding deviation, i.e., $\rho_c(\tilde{V}_c)=0, \forall c \in C$, all K users in the network will receive their demanded virtual received signals without any satisfaction of virtualization demand inter-cell interference.

Observe that the system performance is closely related to the leakage $f_c(\tilde{V}_c)$ and the precoding deviation $\rho_c(\tilde{V}_c)$ in these multi-cell MIMO WNV settings. In the following, three convex coordinated precoding optimization methods are disclosed to trade off the impacts of signal leakage and precoding deviation subject to a per-cell transmit power constraint, in order to reach a targeted desired system performance.

The system performance may be arbitrarily defined as a function that depends on the leakage $f_c(\tilde{V}_c)$ and the precoding deviation $\rho_c(\tilde{V}_c)$, and possibly other system parameters. As an example, numerical results using the max-min user rate as a system performance objective are shown below.

Weighted Sum Minimization

The first approach of the InP network node 16c is to minimize a weighted sum of leakage and precoding deviation subject to per-cell maximum transmit power constraints as follows:

$$\mathcal{P}^w(\theta): \min_{\bar{V}} \sum_{c \in C} (1-\theta_c) f_c(\bar{V}_c^w) + \theta_c \rho_c(\bar{V}_c^w)$$
$$\text{s.t. } g_c(\bar{V}_c^w) \le 0, \ \forall c \in C$$

where $\theta \triangleq [\theta_1, \ldots, \theta_C]^T \in [0,1]$ is a weighting vector that can be tuned by the InP network node 16c in order to optimize some predefined system performance objective. For a given $\theta \in [0,1]$, define $V^{wo}(\theta)$ as an optimal solution to $\mathcal{P}^w(\theta)$, $V^w(\theta) \triangleq \{V:V^{wo}(\theta)\}$ as the set of all optimal solutions to $\mathcal{P}^w(\theta)$. Further define $V^w \triangleq \{V:V^{wo}(\theta), \forall \theta \in [0,1]\}$ as the macro set of all optimal solutions to the weighted sum minimization problem.

The weighted sum minimization problem $\mathcal{P}^w(\theta)$ can be equivalently decomposed into a number of C subproblems, each corresponds to a local precoding optimization problem for cell c as follows:

$$\mathcal{P}_c^w(\theta_c): \min_{\bar{V}_c^w} (1-\theta_c) f_c(\bar{V}_c^w) + \theta_c \rho_c(\bar{V}_c^w) \quad (17)$$
$$\text{s.t. } g_c(\bar{V}_c^w) \le 0.$$

In each cell c, based only on the local channel state $H_c$, the InP network node 16c solves $\mathcal{P}_c^w(\theta_c)$ to minimize the weighted sum of leakage and precoding deviation subject to the maximum transmit power constraint. As such, the coordinated precoding problem $\mathcal{P}^w(\theta)$ is fully distributed, i.e., each cell c locally solves $\mathcal{P}_c^w(\theta_c)$ for its precoding matrix $\tilde{V}_c$ based on the local channel state $\tilde{H}_c$, without any CSI exchange or transmit power coordination across the cells. For a given $\theta_c \in [0,1]$, define $\tilde{V}_c^{wo}(\theta_c)$ as an optimal solution to $\mathcal{P}_c^w(\theta_c)$, and $V_c^w(\theta_c) \triangleq \{\tilde{V}_c: \tilde{V}w_c^{wo}(\theta_c)\}$ as the set of all optimal solutions to $\mathcal{P}_c^w(\theta_c)$.

Fully Distributed Semi-Closed-from Solution

Leveraging the semi-closed-form solution for the single-cell case in the previous section, in the following, it is shown that the weighted sum minimization problem $\mathcal{P}_c^w(\theta_c)$ has a similar solution form. For any $\theta_c \in [0,1]$, $\mathcal{P}_c^w(\theta_c)$ is a convex optimization problem satisfying the Slater's condition, such that strong duality holds. The Lagrange function for $\mathcal{P}_c^w(\theta_c)$ is $$\mathcal{L}_c^w(\theta_c) = (1-\theta_c) f_c(\tilde{V}_c^w) + \theta_c \rho_c(\tilde{V}_c^w) + \lambda_c g_c(\tilde{V}_c^w) \quad (18)$$

where $\lambda_c \ge 0$ is the Lagrangian multiplier associated with the maximum transmit power constraint (17). The dual problem of $\mathcal{P}_c^w(\theta_c)$ is given by $$D_c^w(\theta_c) = \max_{\lambda_c \ge 0} \min_{\bar{V}_c^w} \mathcal{L}_c^w(\bar{V}_c^w, \lambda_c).$$

Define an optimal solution to the dual problem $\mathcal{D}_c^w(\theta_c)$ as $(\tilde{V}_c^{wo}(\theta_c), \lambda_c^o(\theta_c))$.

It is now shown how to solve $\mathcal{P}_c w(\theta_c)$ to obtain an optimal solution $\tilde{V}_c^{wo}(\theta_c)$ for a given $\theta_c \in (0, 1)$. Define $\tilde{H}_c \triangleq [\sqrt{1-\theta_c}\tilde{H}_{1c}{}^H, \ldots, \sqrt{\theta_c}\tilde{H}_{cc}]^H \in \mathbb{C}^{K \times N_c}$ and $\tilde{D}_c \triangleq [0, \ldots, D_c^H, \ldots, 0]^H \in \mathbb{C}^{K \times K_c}$. The KKT conditions lead to a derivation of a semi-closed-form solution $\tilde{V}_c^{wo}(\theta_c)$ to $\mathcal{P}_c^w(\theta_c)$ for any $\theta_c \in (0, 1)$ similar to the single-cell case in the previous section. If $\theta_c = 0$, $\mathcal{P}_c^w(0)$ minimizes the leakage $f_c(\tilde{V}_c^w)$ only, with $\tilde{V}_c^{wo}(0) = 0$ being an optimal solution. If $\theta_c = 1$, $\mathcal{P}_c^w(1)$ minimizes the precoding deviation $\rho_c(\tilde{V}_c^w)$ only, with a semi-closed-solution for $\tilde{V}_c^{wo}(1)$ similar to the single-cell case. The precoding solution to $\mathcal{P}_c^w(\theta_c), \forall \theta_c \in [0, 1]$ is summarized in Algorithm 1 shown in FIG. 10.

Fully Distributed Virtual Transmit Power Allocation

Algorithm 1 may apply to any virtual transmit power allocation $P_c^w \le P_c^{max}$. A design of virtual transmit power allocation for multi-cell coordinated MIMO WNV is now disclosed. A closed-form virtual transmit power allocation strategy, which leads to a fully distributed closed-form precoding solution to the sum of leakage and precoding deviation minimization problem with equal weights is shown. Further, as will be shown below, the system performance achieved by this virtual transmit power allocation strategy is close to the optimal averaged minimum rates of the SPs 94 in the multi-cell settings.

In the idealized case for which the precoding matrix $\tilde{V}_c$ designed by the InP network node 16c for cell c generates no leakage to the other cells and perfectly meets the virtualization demand from cell c, $V_c$ should satisfy $$\tilde{H}_c \tilde{V}_c - \sqrt{P_c^w} \tilde{D}_c = 0 \quad (19)$$

and the maximum transmit power constraint (17). If $\tilde{V}_c$ satisfies (19) and (17), the objective of $\mathcal{P}_c^w(\theta_c)$ equals to 0 for any weighting factor $\theta_c \in [0,1]$. Note that since $\tilde{H}_c \in \mathbb{C}^{K \times N_c}$, there are the following cases.

1) $N_c \ge K$: The solution to (19) which minimizes $\|\tilde{V}_c\|_F^2$ is given by:

$$\tilde{V}_c^o = P_c^w \tilde{H}_c^H (\tilde{H}_c \tilde{H}_c^H)^{-1} \tilde{D}_c. \quad (20)$$

From (20), the virtual transmit power $P_c^w$ can be seen as a power regularization factor for $\tilde{V}_c^o$, to satisfy the maximum transmit power constraint (17). The maximum virtual transmit power $P_c^w$ such that $\tilde{V}_c^o$ in (20) satisfies (17) is given by:

$$P_c^{wo} = \frac{P_c^{max}}{\left\|\tilde{H}_c^H(\tilde{H}_c\tilde{H}_c^H)^{-1}\tilde{D}_c\right\|_F^2}. \quad (21)$$

The downlink precoding matrix $\tilde{V}_c^o$ for cell c in (20) with virtual transmit power $P_c^{wo}$ in (21) generates no leakage from cell c to the other cells, and may perfectly meet the virtualization demand from the SPs 94 in cell c, while satisfying the maximum transmit power constraint in (17), in some embodiments.

2) $N_c<K$: Since (19) is an over-determined equation system, the solution that minimizes the sum of leakage and precoding deviation with equal weights $\|\tilde{H}_c\tilde{V}_c-\sqrt{P_c^w}\tilde{D}_c\|_F^2$ is given by:

$$\tilde{V}_c^\circ = \sqrt{P_c^w}(\tilde{H}_c^H\tilde{H}_c)^{-1}\tilde{H}_c^H\tilde{D}_c. \tag{22}$$

The maximum virtual transmit power $P_c^{w'}$ such that $\tilde{V}_c^\circ$ in (22) satisfies (17) is given by:

$$P_c^{w\circ} = \frac{P_c^{max}}{\left\|(\tilde{H}_c^H\tilde{H}_c)^{-1}\tilde{H}_c^H\tilde{D}_c\right\|_F^2}. \tag{23}$$

The downlink precoding matrix $\tilde{V}_c^\circ$ for cell c in (22) with virtual transmit power $P_c^{w\circ}$ in (23) minimizes the sum of leakage and precoding deviation with equal weights, i.e., the objective of $\mathcal{P}_c^w$ (½), while satisfying the maximum transmit power constraint (17).

Note that the SINR of the $k_c$-th user in cell c using the precoding matrix $\tilde{V}_c^\circ$ in (20) or (22) is given by $$SINR_{k_c} = \frac{\left|[\tilde{H}_{cc}\tilde{V}_c^\circ]_{k_c,k_c}\right|^2}{\sum_{k_i\in\mathcal{K}_c,k_i\neq k_c}\left|[\tilde{H}_{cc}\tilde{V}_c^\circ]_{k_c,k_i}\right|^2 + \sum_{l\neq c}\sum_{k_l\in\mathcal{K}_l}\left|[\tilde{H}_{cl}\tilde{V}_l]_{k_c,k_i}\right|^2 + \sigma_n^2}$$

which is monotonically increasing with the virtual transmit power $P_c^w$ in (20) or (22), with $\tilde{V}_l$, $l\in\mathcal{C}$, $l\neq c$ fixed for the other cells, where $\mathcal{K} \triangleq \{1, \ldots, K_c\}$. As such, with the InP-designed actual downlink precoding matrix $\tilde{V}_c^\circ$ in (20) or (22), the virtual transmit power $P_c^{w\circ}$ in (21) or (23) greedily maximizes the SINRs of the $K_c$ users in cell c.

If each cell c is equipped with $N_c \geq K$ antennas and adopts $\tilde{V}_c^\circ$ in (23) with $P_c^{w\circ}$ in (21), there are several desired system-level properties. First, there is no inter-cell or inter-SP interference in the network. Second, the virtualization demand from the SPs 94 is perfectly met by the InP network node 16c. Third, the SINRs of users in each cell are greedily maximized by the virtual transmit power.

Constrained Leakage Minimization

The second approach for the InP network node 16c is to minimize the leakage, subject to per-cell precoding deviation and maximum transmit power constraints as follows:

$$\mathcal{P}^l(\delta): \min_{V^l} \sum_{c\in C} f_c(\tilde{V}_c^l)$$

$$\text{s.t. } \rho_c(\tilde{V}_c^l) - \delta_c \leq 0, \quad \forall c \in C,$$

$$g_c(\tilde{V}_c^l) \leq 0, \quad \forall c \in C$$

where $\delta \triangleq [\delta_1, \ldots, \delta_C]^T \succeq 0$ is the precoding deviation limit vector that can be set by the InP network node 16c. For a given $\delta \succeq 0$, define $V^{lo}(\delta)$ as an optimal solution to $\mathcal{P}^l(\delta)$, $V^l(\delta) \triangleq \{V^l:V^{lo}(\delta)\}$ as the set of all optimal solutions to $\mathcal{P}^l(\delta)$. Further define $V^l \triangleq \{V:V^{lo}(\delta), \forall \delta \succeq 0\}$ as the macro set of all optimal solutions to the leakage minimization problem.

Feasibility

There is always a feasible solution to the weighted sum minimization problem $\mathcal{P}^w(\theta)$. The feasibility of the leakage minimization problem $\mathcal{P}^l(\delta)$ is now presented. Since the objective of $\mathcal{P}^l(\delta)$ is the sum of the leakages generated from all cells, and the precoding deviation and maximum transmit power constraints are on each of the cells, $\mathcal{P}^l(\delta)$ can be equivalently decomposed into a number of C subproblems. Each subproblem corresponds to a local precoding optimization problem for cell c as follows:

$$\mathcal{P}_c^l(\delta_c): \min_{\tilde{V}_c^l} f_c(\tilde{V}_c^l) \tag{24}$$

$$\text{s.t. } \rho_c(\tilde{V}_c^l) - \delta_c \leq 0,$$

$$g_c(\tilde{V}_c^w) \leq 0. \tag{25}$$

$\mathcal{P}_c^l(\delta_c)$ is a convex optimization problem. However, $\mathcal{P}_c^l(\delta_c)$ can be infeasible for a small value of $\delta_c$, and does not have a semi-closed-form solution as the weighted sum minimization problem $\mathcal{P}_c^w(\theta_c)$. For a given $\delta_c \geq 0$, define $\tilde{V}_c^{lo}(\delta_c)$ as an optimal solution to $\mathcal{P}_c^l(\delta_c)$, and $V_c^l(\delta_c) \triangleq \{\tilde{V}_c:\tilde{V}_c^{lo}(\delta_c)\}$ as the set of all optimal solutions to $\mathcal{P}_c^l(\delta_c)$.

The following lemma gives the condition of $\delta_c$ on the feasibility of the leakage minimization problem $\mathcal{P}_c^l(\delta_c)$.

Lemma 2. The minimum value of $\delta_c \geq 0$ such that $\mathcal{P}_c^l(\delta_c)$ has a feasible solution is $$\delta_c^- \triangleq \rho_c(\tilde{V}_c^{w\circ}(1)). \tag{26}$$

Connection with Weighted Sum Minimization

One interesting property of the leakage minimization problem $\mathcal{P}_c^l(\delta_c)$ is its relation to the weighted sum minimization problem $\mathcal{P}_c^w(\theta_c)$. Define $1^-<1$ to be infinitesimally close to 1. The following lemma shows that instead of solving $\mathcal{P}_c^l(\delta_c^-)$ for an optimal solution, $\mathcal{P}_c^w(1^-)$ may be solved instead.

Lemma 3. An optimal solution sets of $\mathcal{P}_c^l(\delta_c^-)$ and $\mathcal{P}_c^w(1^-)$ are the same, i.e., $$V_c^l(\delta_c^-)=V_c^w(1^-). \tag{27}$$

Note that strong duality always holds for the weighted sum minimization problem $\mathcal{P}_c^w(\theta_c)$. The following lemma gives the condition of precoding deviation limit vector $\delta_c$ such that strong duality holds for the leakage minimization problem $\mathcal{P}_c^l(\delta_c)$.

Lemma 4. For any $\delta_c > \delta_c^-$, there exists a $\tilde{V}_c^l$ such that constraints (24) and (25) in $\mathcal{P}_c^l(\delta_c)$ are satisfied with strict inequalities, i.e., Slater's condition is satisfied and thus strong duality holds for $\mathcal{P}_c^l(\delta_c), \forall \delta_c > \delta_c^-$.

From Lemma 4, for any $\delta_c > \delta_c^-$, $\mathcal{P}_c^l(\delta_c)$ can be solved through its dual problem. The Lagrange function for $\mathcal{P}_c^l(\delta_c)$ is given by $$\mathcal{L}_c^l(\tilde{V}_c^l, \gamma_c, \eta_c) = f_c(\tilde{V}_c^l) + \gamma_c[\beta_c(\tilde{V}_c^l) - \delta_c] + \eta_c g_c(\tilde{V}_c^l)$$

where $\gamma_c \geq 0$ and $\eta_c \geq 0$ are the Lagrangian multipliers associated with the precoding deviation constraint (equation 24) and the maximum transmit power constraint (equation 25), respectively. The dual problem of $\mathcal{P}_c^l(\delta_c)$ is given by $$\mathcal{D}_c^l(\delta_c) = \max_{\gamma_c \geq 0, \eta_c \geq 0} \min_{\tilde{V}_c^l} \mathcal{L}_c^l(\tilde{V}_c^l, \gamma_c, \eta_c).$$

Define an optimal solution to the dual problem $\mathcal{D}_c^l(\delta_c)$ as $(\tilde{V}_c^{lo}(\delta_c), \gamma_c^\circ(\delta_c), \eta_c^\circ(\delta_c))$. By drawing connections between $\mathcal{D}_c^w(\theta_c)$ and $\mathcal{D}_c^l(\delta_c)$, the following lemma shows that for any $\delta_c > \delta_c^-$, there exist a corresponding weighting $\theta_c \in [0,1]$, such that the weighted sum minimization problem $\mathcal{P}_c^w(\theta_c)$ can be solved instead of $\mathcal{P}_c^l(\delta_c)$.

Lemma 5. For any $\delta_c > \delta_c^-$, by setting $$\theta_c = \frac{\gamma_c^\circ(\delta_c)}{1 + \gamma_c^\circ(\delta_c)},$$

optimal solution sets of $\mathcal{P}_c^w(\theta_c)$ and $\mathcal{P}_c^l(\delta_c)$ are the same, i.e., $$V_c^l(\delta_c) = V_c^w\left(\frac{\gamma_c^\circ(\delta_c)}{1 + \gamma_c^\circ(\delta_c)}\right), \forall \delta_c > \delta_c^-.$$

From the results in Lemma 3 and Lemma 5, for any $\delta_c \geq \delta_c^-$, there exists a corresponding $\theta_c \geq 0$, such that the optimal solution set of $\mathcal{P}_c^w(\theta_c)$ and $\mathcal{P}_c^l(\delta_c)$ are the same. The following theorem shows that the macro optimal solution set of the leakage minimization problem $V^l$ is a subset of the macro optimal solution set of the weighted sum minimization problem $V^w$.

Theorem 6. The macro optimal solution set of $\mathcal{P}^l(\delta)$ belongs to the macro optimal solution set of $\mathcal{P}^w(\theta)$, i.e., $$V^l \subseteq V^w. \tag{29}$$

From Theorem 6, the macro optimal solution set of the leakage minimization problem $\mathcal{P}^l(\delta)$ is a subset of the macro optimal solution set of the weighted sum minimization problem $\mathcal{P}^w(\theta)$. This implies focusing on solving $\mathcal{P}^w(\theta)$, which has a fully distributed semi-closed-form solution in Algorithm 1, while always achieving better system performance than solving the more complicated leakage minimization problem $\mathcal{P}^l(\delta)$.

Constrained Precoding Deviation Minimization

A third approach is to minimize the precoding deviation, subject to per-cell leakage and maximum transmit power constraints as follows:

$$\mathcal{P}^d(\phi): \min_{V^d} \sum_{c \in C} \rho_c(\tilde{V}_c^d)$$

s.t. $f_c(\tilde{V}_c^d) - \phi_c \leq 0, \forall c \in C,$ $g_c(\tilde{V}_c^d) \leq 0, \forall c \in C$ where $\phi \triangleq [\phi_1, \ldots, \phi_C]^T \geq 0$ is the precoding deviation limit vector that can be set by the InP network node 16c. For a given $\phi \geq 0$, define $V^{do}(\phi)$ as an optimal solution to $\mathcal{P}^d(\phi)$, $V^d(\phi) \triangleq \{V_d : V_d(\phi)\}$ as the set of all optimal solutions to $\mathcal{P}^d(\phi)$. Further define $V^d \triangleq \{V : V^{do}(\phi), \forall \phi \geq 0\}$ as the macro set of all optimal solutions to the precoding deviation minimization problem.

The objective of $\mathcal{P}^d(\phi)$ is the sum of the precoding deviation of all cells, and the leakage and transmit power constraints are on each of the cells, it follows that $\mathcal{P}^d(\phi)$ can be equivalently decomposed into C subproblems as follows:

$$\mathcal{P}_c^d(\phi_c): \min_{\tilde{V}_c^d} \rho_c(\tilde{V}_c^d) \tag{30}$$

s.t. $f_c(\tilde{V}_c^d) - \phi_c \leq 0,$ $g_c(\tilde{V}_c^d) \leq 0. \tag{31}$ For any $\phi_c \geq 0$, $\tilde{V}_c^d = 0$ is a feasible solution to $\mathcal{P}_c^d(\phi_c)$. It follows that the precoding deviation minimization problem $\mathcal{P}^d(\phi)$ is always feasible.

Now, the relationship between the precoding deviation minimization problem $\mathcal{P}_c^d(\phi_c)$ and the weighted sum minimization problem $\mathcal{P}_c^w(\theta_c)$ is disclosed. Define $0^+ > 0$ to be infinitesimally close to 0. The following lemma shows that instead of solving $\mathcal{P}_c^d(0)$, $\mathcal{P}_c^w(0^+)$ can be solved instead to obtain the same optimal solution set.

Lemma 7. The optimal solution sets of $\mathcal{P}_c^d(0)$ and $\mathcal{P}_c^w(0^+)$ are the same, i.e., $$V_c^d(0) = V_c^w(0^+). \tag{32}$$

Similar to Lemma 4, strong duality holds for $\mathcal{P}_c^d(\phi_c)$, $\forall \phi_c > 0$, and the dual problem can be solved instead. The Lagrange function for $\mathcal{P}_c^d(\phi_c)$ is given by $$\mathcal{L}_c^d(\tilde{V}_c^d, \zeta_c, \xi_c) = \zeta_c[f_c(\tilde{V}_c^d) - \phi_c] + \rho_c(\tilde{V}_c^d) + \xi_c g_c(\tilde{V}_c^d)$$

where $\zeta_c \geq 0$ and $\xi_c \geq 0$ are the Lagrangian multipliers associated with the leakage constraint (equation 31) and the maximum transmit power constraint (equation 3131), respectively. The dual problem of $\mathcal{P}_c^d(\phi_c)$ is given by $$\mathcal{D}_c^d(\phi_c) = \max_{\zeta_c \geq 0, \xi_c \geq 0} \min_{\tilde{V}_c^d} \mathcal{L}_c^d(\tilde{V}_c^d, \zeta_c, \xi_c).$$

Define an optimal solution to $\mathcal{D}_c^d(\phi_c)$ as $(\tilde{V}_c^{do}(\phi_c), \zeta_c^\circ(\phi_c), \xi_c^\circ(\phi_c))$. By drawing connections between $\mathcal{D}_c^w(\theta_c)$ and $\mathcal{D}_c^d(\phi_c)$, the following lemma shows that for any $\phi_c > 0$, there exists a corresponding $\theta_c \in [0,1]$, such that the weighted sum minimization problem $\mathcal{P}_c^w(\theta_c)$ can be solved instead.

Lemma 8. For any $\phi_c > 0$, by setting $$\theta_c = \frac{1}{1 + \zeta_c^\circ(\phi_c)},$$

the optimal solution sets of $\mathcal{P}_c^w(\theta_c)$ and $\mathcal{P}_c^d(\phi_c)$ are the same, i.e., $$V_c^d(\phi_c) = V_c^w\left(\frac{1}{1 + \zeta_c^\circ(\phi_c)}\right), \forall \phi_c > 0. \tag{33}$$

From the results in Lemma 7 and 8, for any $\phi_c \geq 0$, there exists a corresponding $\theta_c \in [0,1]$ such that the optimal solutions sets of $\mathcal{P}_c^d(\phi_c)$ and $\mathcal{P}_c^w(\theta_r)$ are the same. The following theorem shows that the macro optimal solution set of the precoding deviation minimization problem $V^l$ is a subset of the macro optimal solution set of the weighted sum minimization problem $V^w$.

Theorem 9. The macro optimal solution set of $\mathcal{P}^d(\phi)$ belongs to the macro optimal solution set of $\mathcal{P}^w(\theta)$, i.e., $$V^d \subseteq V^w. \tag{34}$$

From the results in Theorem 9, instead of solving the precoding deviation minimization problem $\mathcal{P}^d(\phi)$, the weighted sum minimization problem $\mathcal{P}^w(\theta)$, which has a fully distributed semi-closed-form solution in Algorithm 1 and can achieve better system performance than solving the more complicated precoding deviation minimization problem $\mathcal{P}^d(\phi)$.

The following simulation results focus on evaluating the system performance achieved by solving the weighted sum minimization problem.

Simulation Results $$R_{min}(V) \triangleq \frac{1}{CM} \sum_{c \in \mathcal{C}} \sum_{m \in \mathcal{M}} \min_{k_c^m \in \mathcal{K}_c^m} \{\log_2(1 + SINR_{k_c^m})\} \quad (35)$$

where $SINR_{k_c^m}$ is the SINR of the $k_c^m$-th user of SP m in cell c given by $$SINR_{k_c^m} = \frac{\left|[H_{cc}^m V_c^m]_{k_c^m, k_c^m}\right|^2}{\sum_{k_c^i \neq k_c^m} \left|[H_{cc}^m V_c^m]_{k_c^m, k_c^i}\right|^2 + \sum_{j \neq m} \sum_{k_c^j \in \mathcal{K}_c^j} \left|[H_{cc}^m V_c^j]_{k_c^m, k_c^j}\right|^2 + \sum_{l \neq c} \sum_{j \in \mathcal{M}} \sum_{k_l^j \in \mathcal{K}_l^j} \left|[H_{cl}^m V_l^j]_{k_c^m, k_l^j}\right|^2 + \sigma_n^2}.$$

This system metric $R_{min}(V)$ is highly non-convex in terms of the coordinated precoding V, and is particularly challenging to optimize. Even in a non-virtualized network, coordinated precoding for max-min SINR with per-cell transmit power constraint may still be an open problem without and exact solution.

Simulation Setup

As shown in FIG. 11, consider an InP which owns a MIMO cellular network comprising C=7 urban hexagon micro cells, in which each cell c is of $R_c$=500 m radius and has a BS 16c at the center. Furthermore, assume that in each cell c, the InP serves M=4 SPs 94, each SP m serves $K_c^m$=2 users, for a total of $K_c$=8 users. Following the standard LTE specifications, set the maximum transmit power limit $P_c^{max}$=33 dBm, the noise spectral density $N_0$=10 dB, and focus on the channel over one subcarrier with bandwidth $B_W$=15 kHz as default system parameters. The channel between the BS in cell c and user k is modeled as $h_c^k = \sqrt{\beta_c^k} g_c^k$, where $g_c^k \sim \mathcal{CN}(0, I)$, $\beta_c^k$ [dB]=−31.54−33 $\log_{10}(d_c^k) - \psi_c^k$ represents the path-loss and shadowing with $d_c^k$ being the distance in kilometers from the BS in cell c to user k and $\psi_c^k \sim \mathcal{CN}(0, \sigma_\psi^2)$ being the shadowing with $\sigma_\psi$=8 dB. Assume the channel state estimation error is Gaussian distributed with standard deviation $e_H$ from the mean of the accurate channel state. Our default simulation parameters are summarized in Table I.

TABLE I

| Parameter | Value |
| --- | --- |
| Number of cells C | 7 |
| Number of SPs M | 4 |
| Number of users per cell $K_c$ | 8 |
| Transmission channel bandwidth $B_W$ | 15 kHz |
| Noise spectral density $N_0$ | −174 dBm/Hz |
| Noise figure $N_F$ | 10 dB |
| Maximum transmit power per cell $P_{max}^c$ | 33 dBm |

For a performance study, assume, for example, that each SP m adopts maximum ratio transmission (MRT) or ZF precoding, which are two commonly used precoding schemes in current MIMO systems, to design its normalized virtual precoding matrix given by:

$$W_{cc}^m = \begin{cases} \overline{\omega}_{cc}^m H_{cc}^{mH}, & MRT \\ \overline{\omega}_{cc}^m H_{cc}^{mH} (H_{cc}^m H_{cc}^{mH})^{-1}, & ZF \end{cases} \quad (36)$$

where $\overline{\omega}_{cc}^m$, is a power normalization factor such that $\|W_{cc}^m\|_F^2 = 1$. Assume the InP allocates equal virtual transmit power to the SPs 94 in each cell for fair resource allocation, i.e., $$\alpha_c^m = \frac{1}{M},$$

$\forall m \in \mathcal{M}$ $\forall c \in \mathcal{C}$. Note that the max-min SINR precoder under single-cell settings is actually minimum mean square error (MMSE) precoding, which approaches ZF precoding in the high SNR region. In the multi-cell MIMO WNV framework disclosed herein, since the SPs 94 locally design their normalized virtual precoding matrices without considering either the inter-SP interference or the inter-cell interference, each SP actually attempts to maximize the minimum SINR of its users when it adopts ZF precoding for its demanded precoding design. In the simulations, negligible performance difference between the two cases where all SPs 94 adopt the max-min SINR precoding and where all SPs 94 adopt ZF precoding is observed.

Impact of Virtual Transmit Power

Due to the huge search space of different combinations of $P_c^w$ and $\theta_c$ to reach the optimal system performance, assume in the simulation that the InP network node 16c sets the same virtual transmit power $P_c^w$ to each cell, i.e., $P_c^w = P^w, \forall c \in \mathcal{C}$. Set $$\omega = \frac{\theta_c}{1 - \theta_c},$$

Figure 12:
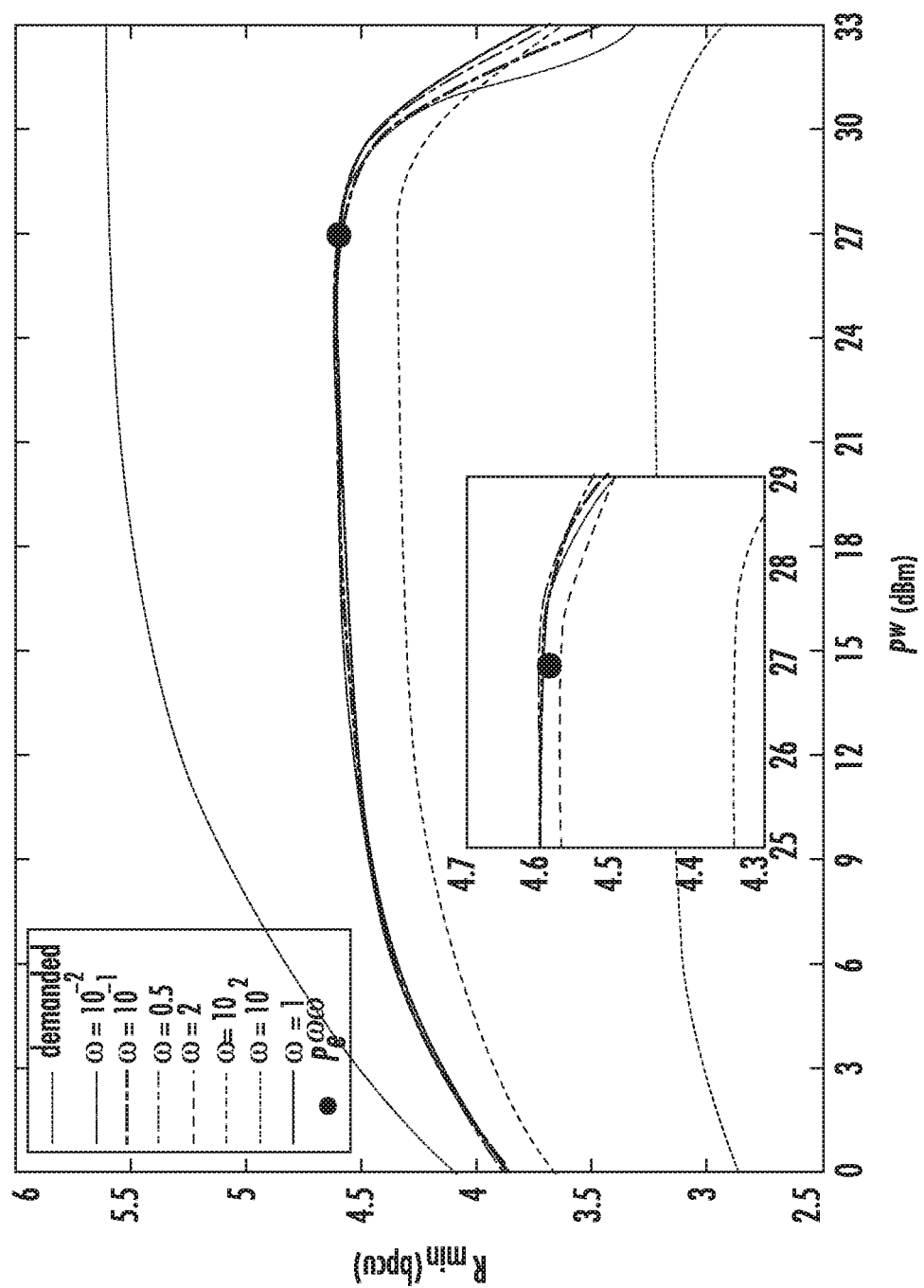
FIG. 12 is a graph of $R_{min}$ vs. $P^w$ with different values of $\omega$ when all SPs adopt MRT precoding and $N_c=32$.
Figure 13:
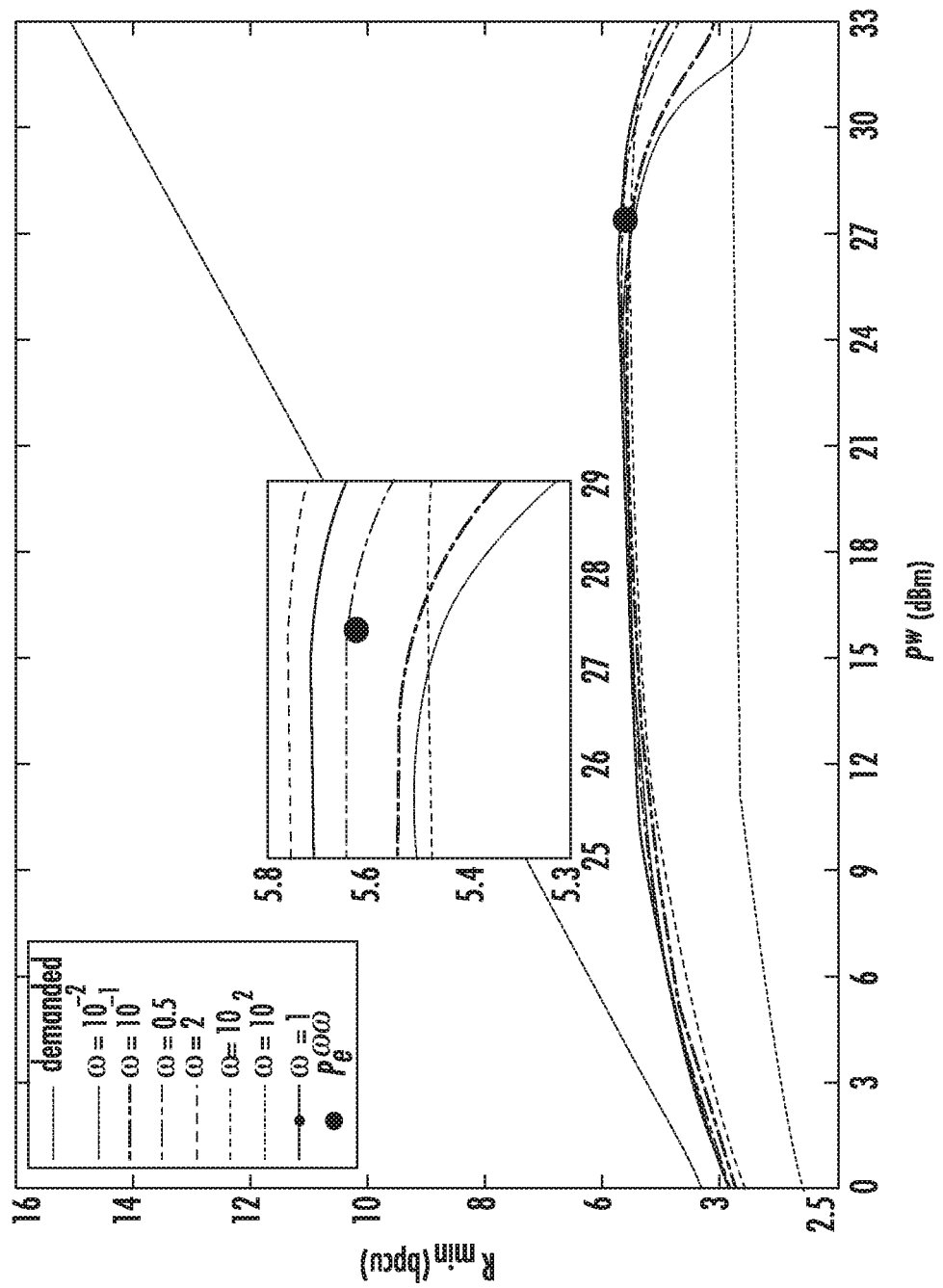
FIG. 13 is a graph of $R_{min}$ vs. $P^w$ with different values of $\omega$ when all SPs adopt ZF precoding and $N_c=32$.

$\forall c \in \mathcal{C}$, and vary ω to trade off the impact of signal leakage and precoding deviation on our algorithm performance. FIGS. 12 and 13 show the averaged minimum rates of the SPs 94 $R_{min}$ versus $P^w$ and ω, when all SPs 94 adopt MRT and ZF precoding with $N_c$=32, respectively. Note that the demanded rate from the SPs 94 is calculated from the virtualization demand D, which does not consider either the inter-SP interference or the inter-cell interference. Observe, also that the demanded rate is higher than the actual rate achieved, since the number of BS antennas $N_c$=32 is less than the number of users K=56 in the network, such the InP-designed precoding cannot generate zero leakage or achieve zero precoding deviation. The demanded rate when all SPs 94 adopt ZF precoding is much higher than the one when all SPs 94 adopt MRT precoding, since each SP actually maximizes the minimum SINR of its users through ZF precoding. As the virtual transmit power $P^w$ increases, the actual rate achieved first increases and then drastically decreases. This implies that allocating the maximum virtual transmit power to the SPs 94 leaves limited transmit power to the InP network node 16c for interference suppression, which in turn leads to severe system performance loss in the multi-cell MIMO WNV scenario. For both the ZF and MRT precoding cases, setting ω=1 yields a performance that is close to optimum among different values of ω. Using the virtual transmit power allocation $P_c^{wo}$ in (23), the system performance is very close to the turning point of $R_{min}$. As such, when $N_c$<K, the InP network 16c can set $$\theta_c = \frac{1}{2}$$

and allocate $P_c^{wo}$ in (23) to cell c. In this case, the weighted sum minimization problem has a closed-form solution $\tilde{V}_c^\circ$ in (22).

Impact of BS Antennas N_c

Figure 14:
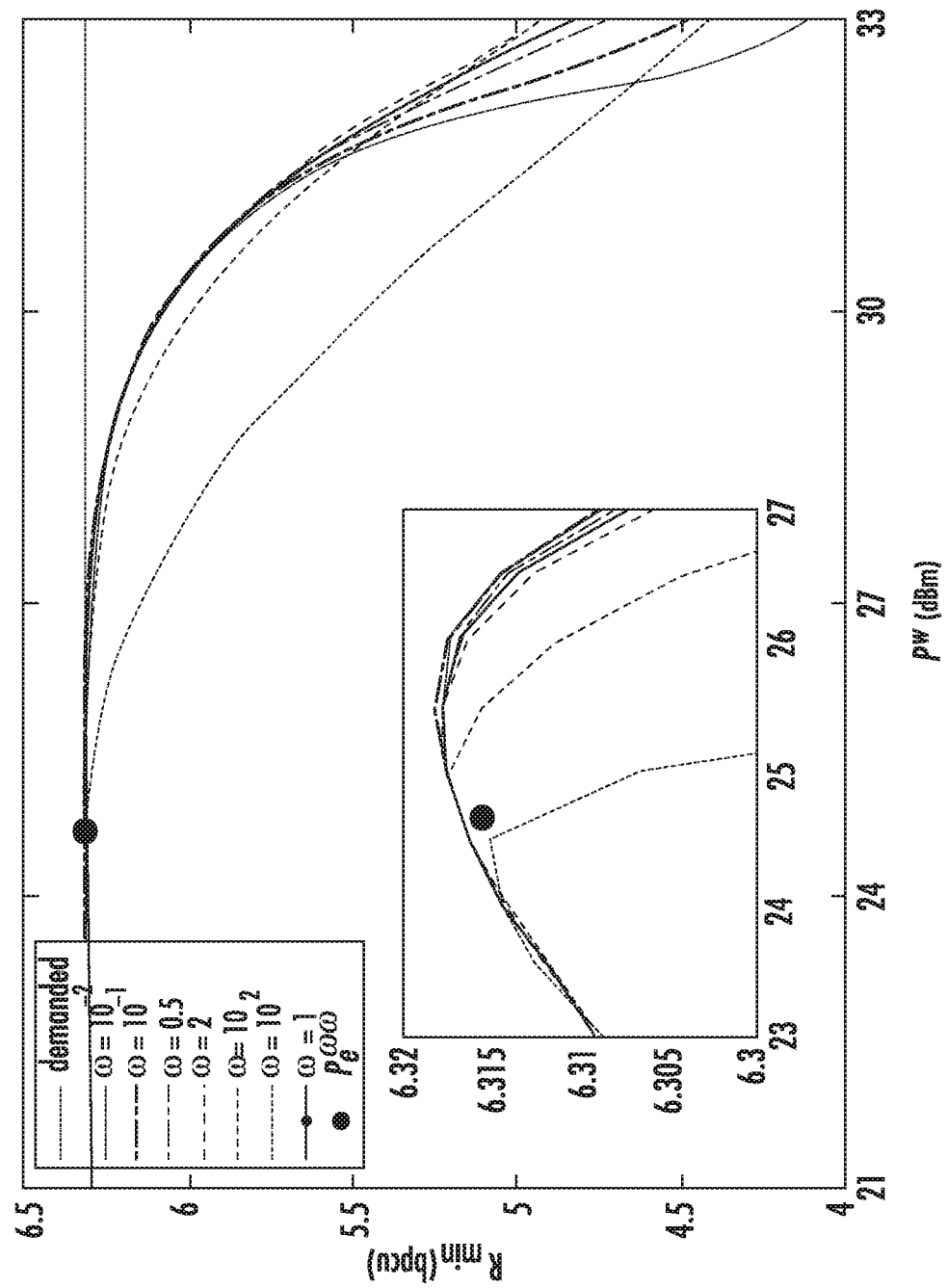
FIG. 14 is a graph of $R_{min}$ vs. $P^w$ with different values of $\omega$ when all SPs adopt MRT precoding and $N_c=64$.
Figure 15:
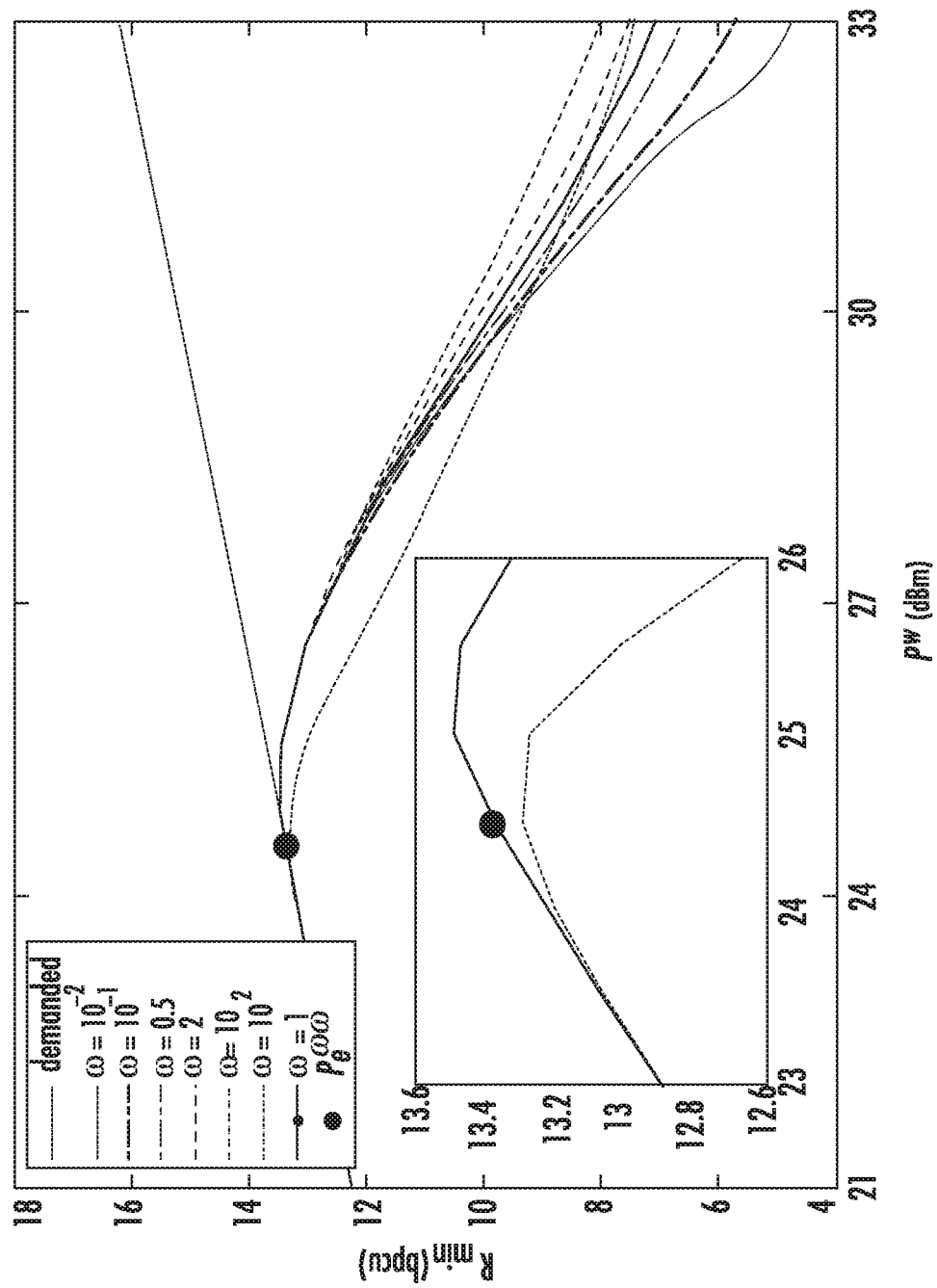
FIG. 15 is a graph of $R_{min}$ vs. $P^w$ with different values of $\omega$ when all SPs adopt ZF precoding and $N_c=64$.

FIGS. 14 and 15 show the averaged minimum rates of the SPs 94 $R_{min}$ versus $P^w$ and $\theta$ with $N_c=64$, when all SPs 94 adopt MRT and ZF precoding, respectively. Compared with the case that $N_c=32$ as shown in FIGS. 13 and 14, there is a drastic system performance boost of the herein-described precoding scheme. This is because the number of BS 16c antennas $N_c=64$ is greater than the number of users K=56 in the network, such that when the virtual transmit power $P^w$ is low, the InP-designed precoding in each cell can generate no leakage to the other cells and perfectly meet the virtualization demand from the SPs 94. For both the MRT and ZF precoding cases, the system performance achieved with the proposed virtual transmit power allocation $P_c^{wo}$ in (21) is almost at the turning point of $R_{min}$. Setting the weighting factor $\omega=1$ still yields a system performance close to optimum among different values of $\omega$. So, when $N_c \geq K$, the InP network node 16c can set $$\theta_c = \frac{1}{2}$$

and allocate $P_c^{wo}$ in (21) to cell c. In this case, the weighted sum minimization problem also has a closed-form solution $\tilde{V}_c^\circ$ in (20). In the following simulation, the InP network node 16c allocates the virtual transmit power in (21) or (23) and the closed-form precoding solution in (20) or (22) for each cell c is used, depending on the relationship between $N_c$ and K.

Impact of CSI Inaccuracy

Figure 16:
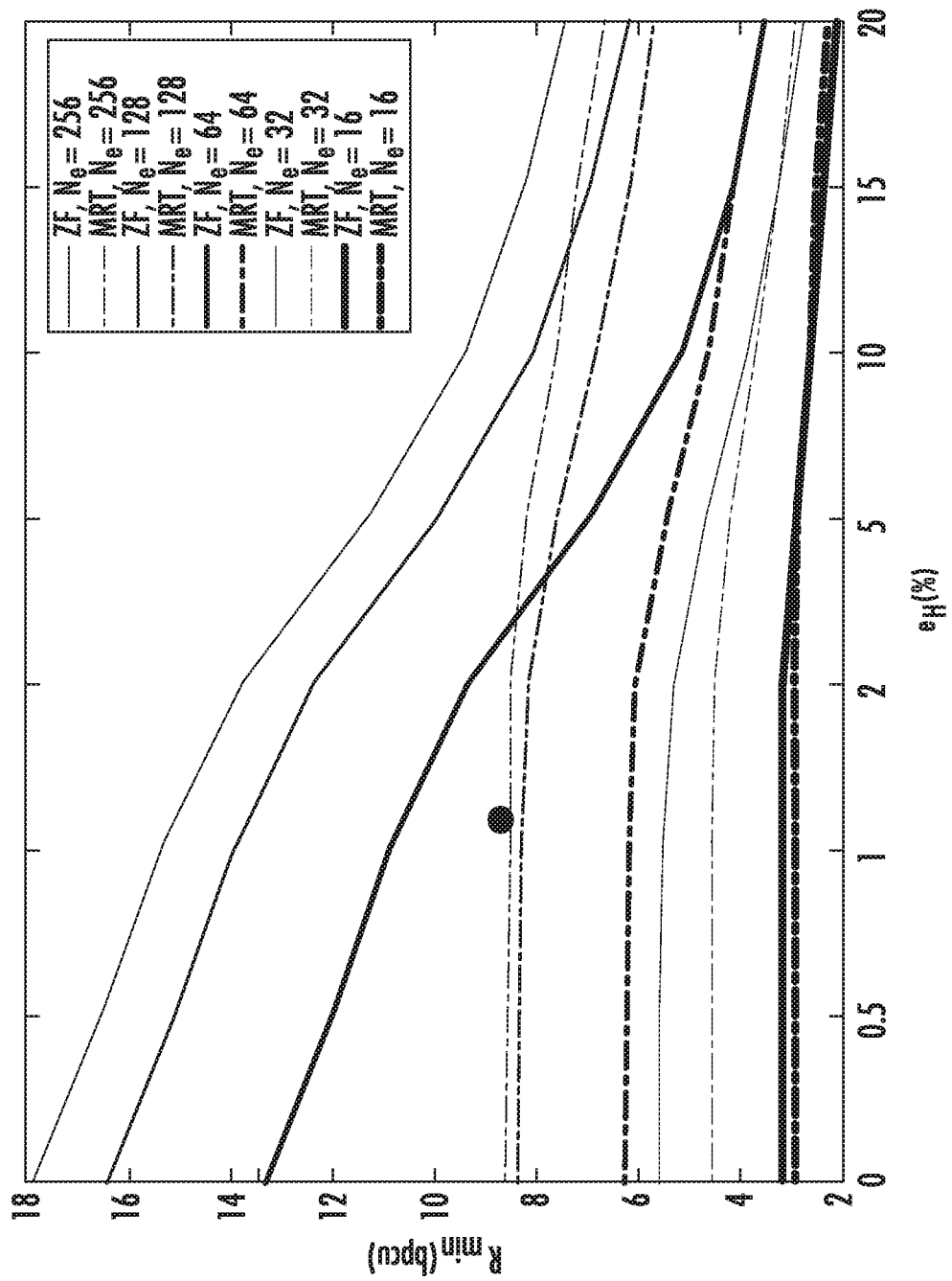
FIG. 16 is a graph of $R_{min}$ vs. $e_H$ with different values of $N_c$.

FIG. 16 shows the averaged minimum rates of the SPs 94 $R_{min}$ versus the CSI inaccuracy $e_H$. It can be seen that a wide range of BS antennas $N_c$ and channel state inaccuracy $e_H$, $R_{min}$ achieved by the case that all SPs 94 adopt ZF precoding is much higher than the case that all SPs 94 adopt MRT precoding. When all SPs 94 adopt ZF precoding, $R_{min}$ is more sensitive to $e_H$ than the MRT precoding case. This is because the precoding disclosed herein aims to minimize the sum of leakage and precoding deviation, and thus inherits the sensitivity to CSI inaccuracy of ZF precoding from the virtualization demand made by the SPs 94. The MRT precoding case outperforms the ZF precoding case only when the CSI inaccuracy is high ($e_H \geq 10\%$) and the number of BS antennas is low ($N_c=16$). Note that the number of users in the network is K=56, as the number of BS antennas $N_c$ increases from 32 to 64, $R_{min}$ drastically increases, indicating the performance gain of massive MIMO in coordinated WNV.

Performance Comparison $$V_{ZF} = \overline{\omega} H (HH^H)^{-1} \quad (37)$$

where $\overline{\omega}$ is a power normalization factor such that $\|V_{ZF}\|_F^2 = \sum_{c \in \mathcal{C}} P_c^{max}$. Note that our proposed coordinated precoding coordinates the BSs at the precoding level subjected to the per-cell transmit power constraints, while the cooperative ZF precoding $V_{ZF}$ requires signal-level coordination subjected to the sum transmit power constraint only. The coordinated solution is compared to the solutions presented herein with a frequency division (FD) upper bound, yielded by using cooperative ZF precoding $$V_{ZF}^m = \overline{\omega}^m H^m (H^m H^{mH})^{-1} \quad (38)$$

to serve all the $\sum_{c \in \mathcal{C}} K_c^m$ users of each SP m using bandwidth $$\frac{B_W}{M},$$

where $H^m \in \mathbb{C}^{\sum_{c \in \mathcal{C}} K_c^m \times N}$ is the channel state between the $\sum_{c \in \mathcal{C}} K_c^m$ of SP m and the N antennas in the network, and $\overline{\omega}^m$ is a power normalization factor such that $\|V_{ZF}^m\|_F^2 = \sum_{c \in \mathcal{C}} P_c^{max}$. Note that the above two precoding schemes are cooperative precoding methods with relaxed sum power constraint, while the precoding scheme disclosed herein is a coordinated precoding method with per-cell transmit power constraint. Therefore, the above two schemes serve as loose upper bounds for the coordinated precoding methods in the virtualized and FD scenarios, respectively. For fair comparison, the virtualized coordinated precoding disclosed herein is compared with a FD coordinated precoding scheme that allocates $$\frac{B_W}{M}$$

to each SP m, and uses ZF precoding $$V_{c,ZF}^m = \overline{\omega}_c^m H_{cc}^m (H_{cc}^m H_{cc}^{mH})^{-1} \quad (39)$$

to serve the users of SP m in cell c.

Figure 17:
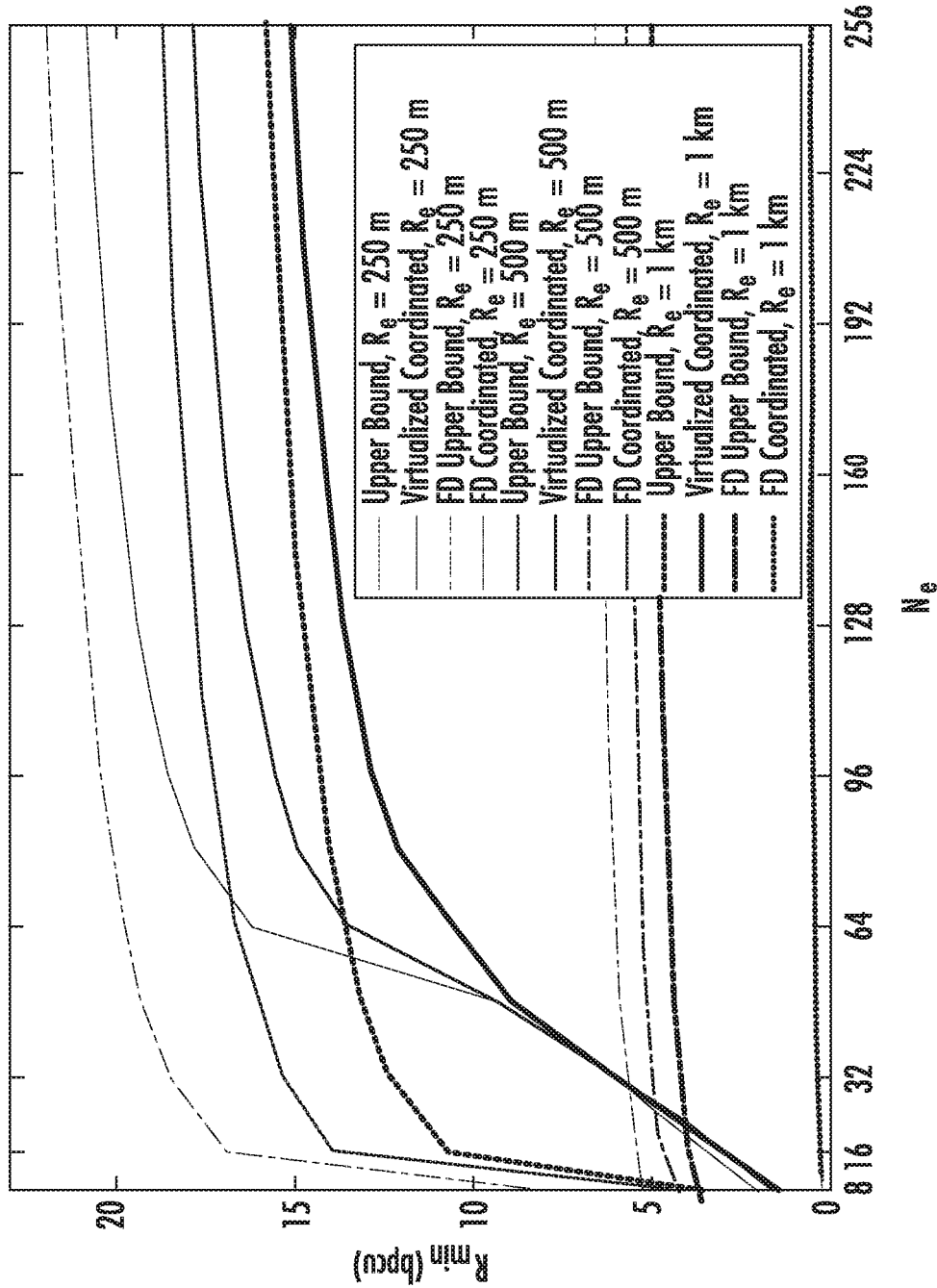
FIG. 17 is a graph of a comparison of $R_{min}$ among the upper bound, the virtualized coordinated precoding disclosed herein, FD upper bound, and FD coordinated precoding with different values of $N_c$ and $R_c$.
Figure 18:
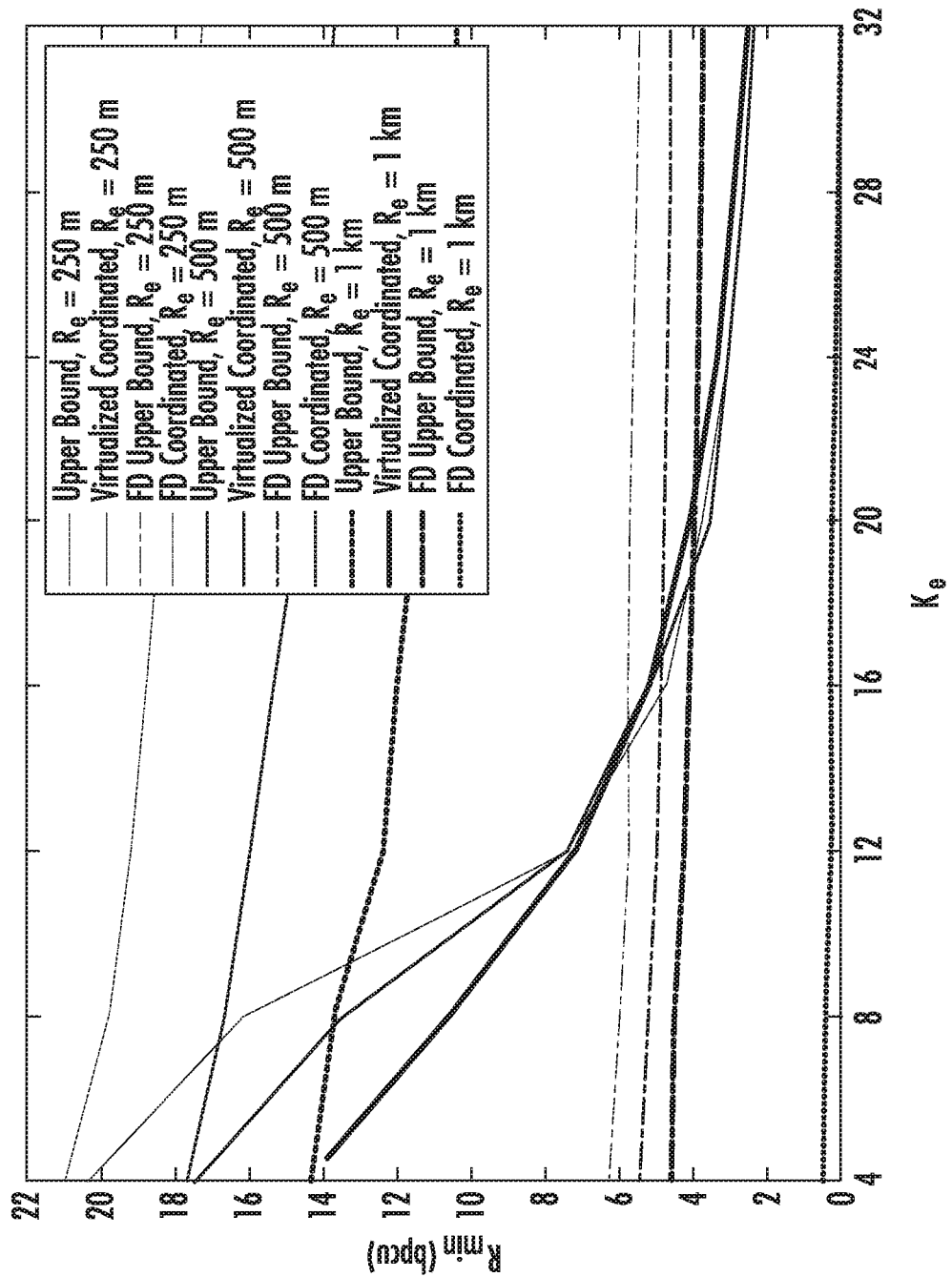
FIG. 18 is a graph of a comparison of $R_{min}$ among the upper bound, the virtualized coordinated precoding disclosed herein, FD upper bound, and FD coordinated precoding with different values of $K_c$ and $R_c$.

FIG. 17 shows the performance comparison between the upper bound, proposed virtualized coordinated precoding, FD upper bound, and FD coordinated precoding with accurate CSI. FIG. 18 shows the impact of user density by varying the number of users $K_c$ with the BS antennas fixed at $N_c=64$. The closed-form coordinated precoding in (20) with virtual transmit power in (21) substantially outperforms the FD upper bound achieved by (38) and is close to optimum compared with upper bound achieved in (37) when the BSs are equipped with $N_c \geq K, \forall c \in \mathcal{C}$ antennas. Note that the cooperative ZF with sum transmit power constraint nulls the inter-user interference and actually maximizes the minimum rate of all users since the BSs are equipped with a total of N≥K antennas. When the number of BS antennas is small, i.e., $N_c < K$, the proposed coordinated precoding does not have enough degrees of freedom in beamforming to null the inter-SP and or inter-cell interference while meeting the virtualization demand from the SPs 94, thus leading to performance deterioration. However, the proposed virtualized coordinated precoding substantially outperforms the FD coordinated precoding. As the cell size increases, the performance gap between the proposed coordinated precoding and the upper bound shrinks when $N_c \geq K$, since there is less inter-cell interference for the InP network node 16c to control and thus more virtual transmit power can be allocated to the SPs 94.

Figure 19:
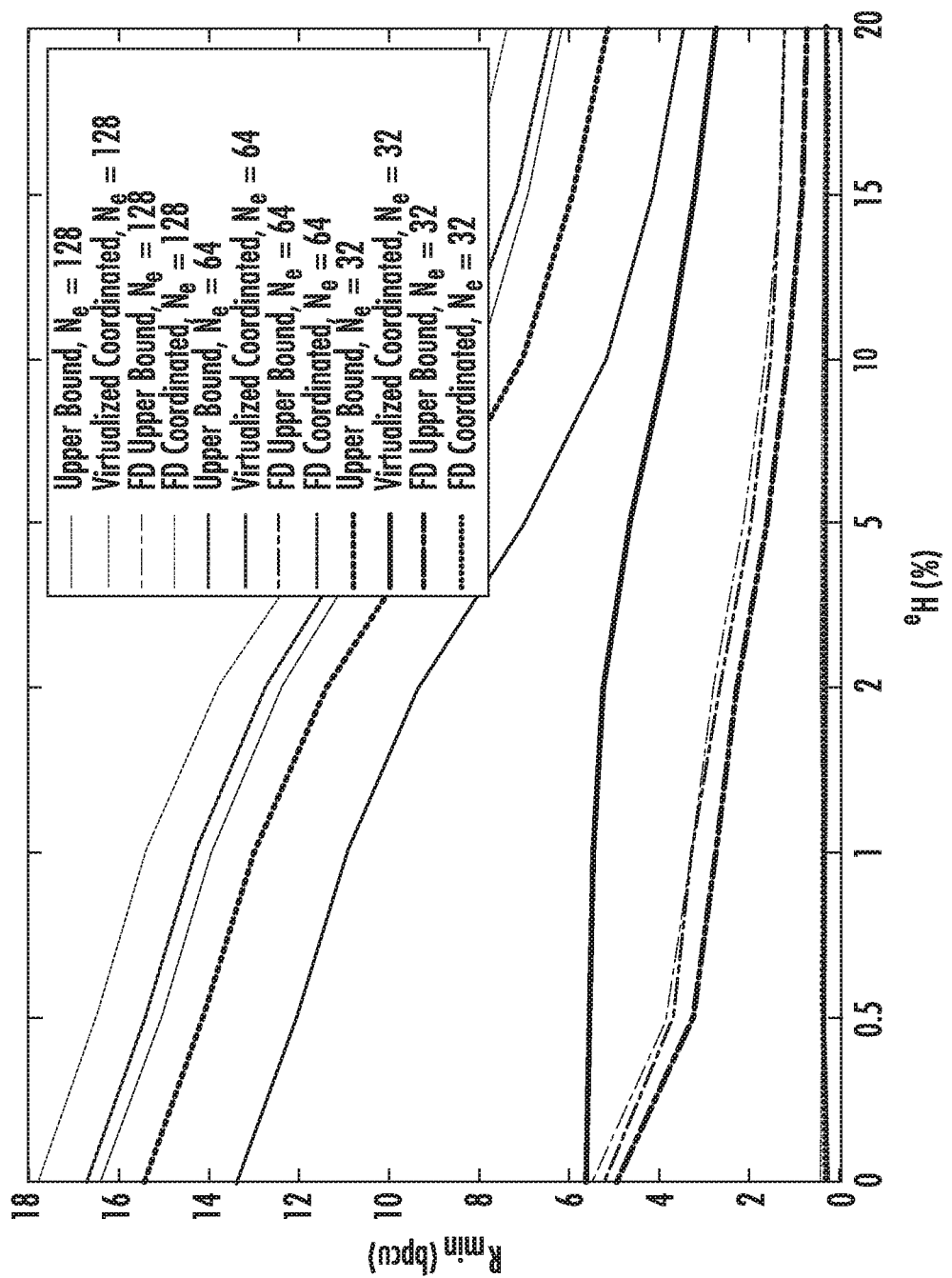
FIG. 19 is a graph of a comparison of $R_{min}$ among the upper bound, the virtualized coordinated precoding disclosed herein, FD upper bound, and FD coordinated precoding with imperfect CSI.

FIG. 19 shows the performance comparison with inaccurate CSI. As the number of BS antennas $N_c$ increases, the performance gap between the proposed coordinated precoding and the upper bound shrinks, indicating the robustness to CSI inaccuracy achievable by use of massive MIMO in a coordinated multi-cell WNV. In addition, the coordinated precoding method disclosed herein substantially outperforms the FD upper bound and FD coordinated precoding scheme, indicating the performance gain of spatial virtualization over the physical isolation schemes for MIMO WNV.

In the multi-cell spatial service isolation framework, each SP is allowed to utilize all antennas and wireless spectrum resources in each cell to demand its virtual precoding based on the service needs of its users, without considering either the inter-SP interference or the inter-cell interference. This substantially reduces the complexity of the SPs 94' precoding design to serve their subscribing users. The InP network node 16c performs virtual transmit power allocation to balance interference suppression and satisfaction of virtualization demand.

Through coordinating the cells at the beamforming level, the InP may design, for implementation via network node 16c, the actual global downlink precoding to reach certain desired system performance, subject to per-cell transmit power constraints. Based on the observation that the system performance is closely related to the signal leakage and precoding deviation from virtualization demand in the multi-cell MIMO WNV framework, three convex coordinated precoding schemes are disclosed: (i) weighted sum of leakage and precoding deviation minimization, (ii) constrained leakage minimization, and (iii) constrained precoding deviation minimization.

In some embodiments, an advantage of the weighted sum minimization strategy is that it naturally leads to fully distributed semi-closed-form implementation without any CSI exchange or power update across the cells. In contrast, existing coordinated precoding schemes for non-virtualized networks are of high computational complexity, and require CSI sharing among the cells or centralized transmit power control. Analysis presented above shows that the system performance achieved by solving the weighted sum minimization problem is better than the performance obtained by solving the other two more complicated precoding problems. Furthermore, a fully distributed closed-form solution with low computational complexity is disclosed.

To summarize, the performance of the proposed virtual transmit power allocation and coordinated precoding schemes for multi-cell MIMO WNV under typical Long Term Evolution (LTE) cellular network settings have been numerically evaluated. As an example, the averaged minimum rates of the SPs 94 are used as a system performance metric. When the BS s are equipped with a large number of antennas, the system performance of a virtualized network enabled by simulated closed-form coordinated precoding is close to optimum compared with the upper bound achieved through cooperative ZF precoding for non-virtualized networks with relaxed power constraint. Extensive simulation results demonstrate the impact of the precoding strategy adopted by the SPs 94, number of BS antennas, cell size, and channel state inaccuracy.

According to one aspect, a network node 16c is configured to communicate with a plurality of service providers (SP) and wireless devices (WDs). The network node 16c includes a radio interface 62 and/or comprising processing circuitry 68 configured to: in each of a plurality of successive transmission time periods: transmit to each of a plurality of SPs 94 $m$ a corresponding set of channel information, $H^m$; receive from each of the plurality of SPs 94 $a$ service demand and a normalized precoding matrix, $W^m$, the normalized precoding matrix $W^m$ being determined by the corresponding SP based on the corresponding set of channel information $H^m$; allocate a virtual transmit power $\alpha^m P^w$ to each of the plurality of SPs 94 based at least in part on the received service demands and normalized precoding matrices, $W^m$; and determine a downlink precoding matrix, V, to transmit messages to WDs, the downlink precoder matrix V being based at least in part on the received service demands and normalized precoding matrices, $W^m$.

According to this aspect, in some embodiments, the virtual transmit power allocations are determined, via the processing circuitry 68 and/or radio interface 62 that provide a specified balance between interference suppression/virtualization demand attainment and achieving a specified performance. In some embodiments, providing the specified balance is based at least in part on allocation of a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\sum_{m \in \mathcal{M}} \alpha_c^m = 1$, and $P_c^{max}$ a maximum transmit power limit on the BS in cell c. In some embodiments, the processing circuitry 68 is further configured to determine the virtual transmit power allocations in a semi-closed form. In some embodiments, the processing circuitry 68 is further configured to determine the virtual transmit power allocations in a closed form. In some embodiments, the processing circuitry 68 is further configured to coordinate C cells at a beamforming level to determine the downlink precoding matrix V to meet a virtualization demand D based at least in part on the received service demands from the SPs 94. In some embodiments, the determination of a downlink precoding matrix, V is based at least in part on a leakage function and a precoding deviation function. In some embodiments, the downlink precoding matrix, V is based at least in part on minimization of a weighted sum of leakage and precoding deviation subject to per-cell maximum transmit power constraints. In some embodiments, the processing circuitry 68 and/or radio interface 62 are further configured to base the allocation of virtual transmit power $\alpha^m P^w$ on the received normalized precoding matrix, $W^m$, without exchange of channel state information (CSI) or transmit coordination across cells served by the network node 16c.

According to another aspect, a method implemented in a network node (base station, BS) 16c in communication with a plurality of service providers (SPs 94) and wireless devices (WDs) includes, in each of a plurality of successive transmission time periods: transmitting, via the radio interface 62, to each of a plurality of SPs 94 $m$ a corresponding set of channel information, $H^m$; receiving from each of the plurality of SPs 94 $a$ service demand and a normalized precoding matrix, $W^m$, the normalized precoding matrix $W^m$ being determined by the corresponding SP based on the corresponding set of channel information $H^m$; allocating, via the processing circuitry 68, a virtual transmit power $\alpha^m P^w$ to each of the plurality of SPs 94 based at least in part on the received service demands and normalized precoding matrices, $W^m$; and determining, via the processing circuitry 68, a downlink precoding matrix, V, to transmit messages to WDs, the precoder matrix V being based at least in part on the received service demands and normalized precoding matrices, $W^m$.

According to this aspect, in some embodiments, the allocating of virtual transmit powers is based on least in part on attaining a specified balance between interference suppression/virtualization demand and achieving a specified performance. In some embodiments, providing the specified balance is based at least in part on allocating a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\sum_{m \in \mathcal{M}} \alpha_c^m = 1$, and $P_c^{max}$ a maximum transmit power limit on the BS in cell c. In some embodiments, the method further includes determining the virtual transmit power allocations in a semi-closed form. In some embodiments, the method further includes determining the virtual transmit power allocations in a closed form. In some embodiments, the method further includes coordinating C cells at a beamforming level to determine the downlink precoding matrix V to meet a virtualization demand D based at least in part on the received service demands from the SPs 94. In some embodiments, the determination of a downlink precoding matrix, V is based at least in part on a leakage function and a precoding deviation function. In some embodiments, the downlink precoding matrix, V is based at least in part on minimization of a weighted sum of leakage and precoding deviation subject to per-cell maximum transmit power constraints. In some embodiments, the method further includes basing the allocation of virtual transmit power $\alpha^m P^w$ on the received normalized precoding matrix, $W^m$, without exchange of channel state information (CSI) or transmit coordination across cells served by the network node 16c.

Some examples include the following:

Example A1. A network node 16 configured to communicate with a plurality of service providers (SP) and wireless devices (WDs) 22, the network node 16 configured to, and/or comprising a radio interface 62 and/or comprising processing circuitry 68 configured to in each of a plurality of successive transmission time periods:
  transmit to each of a plurality of SPs m a corresponding set of channel information, $H^m$;
  receive from each of the plurality of SPs a service demand and a normalized precoding matrix, $W^m$, the normalized precoding matrix $W^m$ being determined by the corresponding SP based on the corresponding set of channel information $H^m$;
  allocate a virtual transmit power $\alpha^m P^w$ to each of the plurality of SPs based at least in part on the received service demands and normalized precoding matrices, $W^m$; and
  determine a downlink precoding matrix, V, to transmit messages to WDs 22, the downlink precoder matrix V being based at least in part on the received service demands and normalized precoding matrices, $W^m$.

Example A2. The network node 16 of Example A1, wherein the virtual transmit power allocations are determined that provide a specified balance between interference suppression/virtualization demand attainment and achieving a specified performance.

Example A3. The network node 16 of Example A2, wherein, providing the specified balance is based at least in part on allocation of a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\sum_{m \in \mathcal{M}} \alpha_c^m = 1$, and $P_c^{max}$ a maximum transmit power limit on the BS in cell c.

Example A4. The network node 16 of any of Examples A1 and A2, wherein the network node 16 and/or the radio interface 62 and/or the processing circuitry 68 is further configured to determine the virtual transmit power allocations in a semi-closed form.

Example A5. The network node 16 of any of Examples A1 and A2, wherein the network node 16 and/or the radio interface 62 and/or the processing circuitry 68 is further configured to determine the virtual transmit power allocations in a closed form.

Example A6. The network node 16 of any of Examples A1-A5, wherein the network node 16 and/or the radio interface 62 and/or the processing circuitry 68 is further configured to coordinate C cells at a beamforming level to determine the downlink precoding matrix V to meet a virtualization demand D based at least in part on the received service demands from the SPs.

Example A7. The network node 16 of any of Examples A1-A6, wherein the determination of a downlink precoding matrix, V is based at least in part on a leakage function and a precoding deviation function.

Example A8. The network node 16 of Example A7, wherein the downlink precoding matrix, V is based at least in part on minimization of a weighted sum of leakage and precoding deviation subject to per-cell maximum transmit power constraints.

Example A9. The network node 16 of any of Examples A1-A8, wherein the network node 16 and/or the radio interface 62 and/or the processing circuitry 68 is further configured to base the allocation of virtual transmit power $\alpha^m P^w$ on the received normalized precoding matrix, $W^m$, without exchange of channel state information (CSI) or transmit coordination across cells served by the network node 16.

Example B1. A method implemented in a network node 16 in communication with a plurality of service providers (SPs) and wireless devices (WDs) 22, the method comprising:

in each of a plurality of successive transmission time periods:
  transmitting to each of a plurality of SPs m a corresponding set of channel information, $H^m$;
  receiving from each of the plurality of SPs a service demand and a normalized precoding matrix, $W^m$, the normalized precoding matrix $W^m$ being determined by the corresponding SP based on the corresponding set of channel information $H^m$;
  allocating a virtual transmit power $\alpha^m P^w$ to each of the plurality of SPs based at least in part on the received service demands and normalized precoding matrices, $W^m$; and
  determining a downlink precoding matrix, V, to transmit messages to WDs 22, the precoder matrix V being based at least in part on the received service demands and normalized precoding matrices, $W^m$.

Example B2. The method of Example B1, wherein the allocating of virtual transmit powers is based on least in part on attaining a specified balance between interference suppression/virtualization demand and achieving a specified performance.

Example B3. The method of Example B2, wherein providing the specified balance is based at least in part on allocating a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\sum_{m \in \mathcal{M}} \alpha_c^m = 1$, and $P_c^{max}$ a maximum transmit power limit on the BS in cell c.

Example B4. The method of any of Examples B1 and B2, further comprising determining the virtual transmit power allocations in a semi-closed form.

Example B5. The method of any of Examples B1 and B2, further comprising determining the virtual transmit power allocations in a closed form.

Example B6. The method of any of Examples B1-B5, further comprising coordinating C cells at a beamforming level to determine the downlink precoding matrix V to meet a virtualization demand D based at least in part on the received service demands from the SPs.

Example B7. The method of any of Examples B1-B6, wherein the determination of a downlink precoding matrix, V is based at least in part on a leakage function and a precoding deviation function.

Example B8. The method of Example B7, wherein the downlink precoding matrix, V is based at least in part on minimization of a weighted sum of leakage and precoding deviation subject to per-cell maximum transmit power constraints.

Example B9. The method of any of Examples B1-B8, further comprising basing the allocation of virtual transmit power $\alpha^m P^w$ on the received normalized precoding matrix, $W^m$, without exchange of channel state information (CSI) or transmit coordination across cells served by the network node 16.

According to yet another aspect, a network node 16 configured to communicate with a plurality of service providers (SPs) and wireless devices (WDs) 22 is provided. The network node 16 includes a radio interface 62 configured to: in each of a plurality of successive transmission time periods: transmit to each of a plurality of SPs m a corresponding set of channel information, $H^m$; and receive from each of the plurality of SPs a service demand and a normalized precoding matrix, $W^m$, the normalized precoding matrix $W^m$ being determined by the corresponding SP based at least in part on the corresponding set of channel information H. The network node 16 also includes processing circuitry 68 in communication with the network node 16, the processing circuitry 68 configured to: allocate a virtual transmit power $\alpha^m P^w$ to each of the plurality of SPs based at least in part on the received service demands and normalized precoding matrices, $W^m$; and determine a downlink precoding matrix, V, to transmit messages to WDs 22, the downlink precoder matrix V being based at least in part on the received service demands and normalized precoding matrices, $W^m$.

According to this aspect, in some embodiments, the virtual transmit power allocations are determined that provide a specified balance between interference suppression/virtualization demand attainment and achieving a specified performance. In some embodiments, providing the specified balance is based at least in part on allocation of a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\Sigma_{m \in M} \alpha_c^m = 1$, and $P_c^{max}$ a maximum transmit power limit on the BS in cell c. In some embodiments, the processing circuitry 68 is further configured to coordinate C cells at a beamforming level to determine the downlink precoding matrix V to meet a virtualization demand D based at least in part on the received service demands from the SPs. In some embodiments, the determination of a downlink precoding matrix, V is based at least in part on a leakage function and a precoding deviation function. In some embodiments, the downlink precoding matrix, V is based at least in part on minimization of a weighted sum of leakage and precoding deviation subject to per-cell maximum transmit power constraints. In some embodiments, the downlink precoding matrix, V is based at least in part on minimization of a leakage subject to per cell precoding deviation and maximum transmit power constraints. In some embodiments, the downlink precoding matrix V is based at least in part on minimization of a precoding deviation subject to per-cell leakage and maximum transmit power constraints. In some embodiments, the processing circuitry 68 is further configured to base the allocation of virtual transmit power $\alpha^m P^w$ on the received normalized precoding matrices, $W^m$, without exchange of channel state information (CSI) or transmit coordination across cells served by the network node 16.

According to another aspect, a method implemented in a network node 16 in communication with a plurality of service providers (SPs) and wireless devices (WDs) 22. Is provided. The method includes, in each of a plurality of successive transmission time periods: transmitting to each of a plurality of SPs m a corresponding set of channel information, $H^m$; receiving from each of the plurality of SPs a service demand and a normalized precoding matrix, $W^m$, the normalized precoding matrix $W^m$ being determined by the corresponding SP based at least in part on the corresponding set of channel information $H^m$; allocating a virtual transmit power $\alpha^m P^w$ to each of the plurality of SPs based at least in part on the received service demands and normalized precoding matrices, $W^m$; and determining a downlink precoding matrix, V, to transmit messages to WDs 22, the precoder matrix V being based at least in part on the received service demands and normalized precoding matrices, $W^m$.

According to this aspect, in some embodiments, the allocating of virtual transmit powers is based at least in part on attaining a specified balance between interference suppression/virtualization demand and achieving a specified performance. In some embodiments, the specified balance is based at least in part on allocating a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\Sigma_{m \in M} \alpha_c^m = 1$, and $P_c^{max}$ a maximum transmit power limit on the BS in cell c. In some embodiments, the method further includes coordinating C cells at a beamforming level to determine the downlink precoding matrix V to meet a virtualization demand D based at least in part on the received service demands from the SPs. In some embodiments, the determination of a downlink precoding matrix, V is based at least in part on a leakage function and a precoding deviation function. In some embodiments, the downlink precoding matrix, V is based at least in part on minimization of a weighted sum of leakage and precoding deviation subject to per-cell maximum transmit power constraints. In some embodiments, the downlink precoding matrix, V is based at least in part on minimization of a leakage subject to per cell precoding deviation and maximum transmit power constraints. In some embodiments, the downlink precoding matrix V is based at least in part on minimization of a precoding deviation subject to per-cell leakage and maximum transmit power constraints. In some embodiments, the method further includes basing the allocation of virtual transmit power $\alpha^m P^w$ on the received normalized precoding matrices, $W^m$, without exchange of channel state information (CSI) or transmit coordination across cells served by the network node 16.

According to yet another aspect, a network node 16 includes a radio interface 62 configured to: receive channel information, $H^m$, from an infrastructure provider, InP; transmit a service demand and a normalized precoding matrix, $W^m$, to the InP; and receive a downlink precoding matrix, V, from the InP to transmit messages to WDs 22, the downlink precoder matrix V being based at least in part on service demands and normalized precoding matrices, W, of a plurality of service providers. The network node 16 also includes processing circuitry 68 in communication with the radio interface, the processing circuitry 68 configured to: determine the normalized precoding matrix, $W^m$, based at least in part on the received channel information $H^m$; and apply the downlink precoder matrix V, to downlink transmissions of the network node 16 to a plurality of wireless devices, WDs 22.

According to another aspect, a method in a network node 16 includes receiving channel information, $H^m$, from an infrastructure provider, InP; determining a normalized precoding matrix, $W^m$, based at least in part on the received channel information $H^m$; transmitting a service demand and a normalized precoding matrix, $W^m$, to the InP; receiving a downlink precoding matrix, V, from the InP to transmit messages to WDs 22, the downlink precoder matrix V being based at least in part on service demands and normalized precoding matrices, W, of a plurality of service providers; and applying the downlink precoder matrix V, to downlink transmissions of the network node 16 to a plurality of wireless devices, WDs 22.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
BS: Base Station
CSI: Channel State Information
FD: Frequency Division
InP: Infrastructure Provider
KKT: Karush-Kuhn-Tucker
LTE: Long-Term Evolution
MIMO: Multiple Input Multiple Output
MMSE: Minimum Mean-Squared Error
MRT: Maximum Transmission Ratio
RB: Resource Block
SINR: Signal to Interference plus Noise Ratio
SNR: Signal to Noise Ratio
SP: Service Provider
WNV: Wireless Network Virtualization
ZF: Zero Forcing It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a plurality of service providers (SPs) and wireless devices, the network node comprising:

a radio interface configured to:
  in each of a plurality of successive transmission time periods:
    transmit to each of a plurality of SPs m a corresponding set of channel information, $H^m$; and
    receive from each of the plurality of SPs a service demand and a normalized precoding matrix, $W^m$, the normalized precoding matrix $W^m$ being determined by the corresponding SP based at least in part on the corresponding set of channel information $H^m$; and
  processing circuitry in communication with the network node, the processing circuitry configured to:
    allocate a virtual transmit power $\alpha^m p^w$ to each of the plurality of SPs based at least in part on the received service demands and normalized precoding matrices, $W^m$; and
    determine a downlink precoding matrix, V, to transmit messages to WDs, the downlink precoder matrix V being based at least in part on the received service demands and normalized precoding matrices, $W^m$.

2. The network node of claim 1, wherein the virtual transmit power allocations are determined that provide a specified balance between interference suppression/virtualization demand attainment and achieving a specified performance.

3. The network node of claim 2, wherein, providing the specified balance is based at least in part on allocation of a virtual transmit power $\alpha_c^m P_c^w$ to SP min cell c, where $P_c^w \leq P_c^{max}$ is the virtual transmit power allocated to cell c, and $\alpha_c^m$ is a virtual transmit power allocation factor such that $\Sigma_{m \in \mathcal{M}} = 1$, and $P_c^{max}$ a maximum transmit power limit on the BS in cell c.

4. The network node of claim 1, wherein the processing circuitry is further configured to coordinate C cells at a beamforming level to determine the downlink precoding matrix V to meet a virtualization demand D based at least in part on the received service demands from the SPs.

5. The network node of claim 1, wherein the determination of a downlink precoding matrix, V is based at least in part on a leakage function and a precoding deviation function.

6. The network node of claim 5, wherein the downlink precoding matrix, V is based at least in part on minimization of a weighted sum of leakage and precoding deviation subject to per-cell maximum transmit power constraints.

7. The network node of claim 1, wherein the downlink precoding matrix, V is based at least in part on minimization of a leakage subject to per cell precoding deviation and maximum transmit power constraints.

8. The network node of claim 1, wherein the downlink precoding matrix V is based at least in part on minimization of a precoding deviation subject to per-cell leakage and maximum transmit power constraints.

9. The network node of claim 1, wherein the processing circuitry is further configured to base the allocation of virtual transmit power $\alpha^m P^w$ on the received normalized precoding matrices, $W^m$, without exchange of channel state information (CSI) or transmit coordination across cells served by the network node.

10. A method implemented in a network node in communication with a plurality of service providers (SPs) and wireless devices, the method comprising:
  in each of a plurality of successive transmission time periods:
    transmitting to each of a plurality of SPs m a corresponding set of channel information, $H^m$;
    receiving from each of the plurality of SPs a service demand and a normalized precoding matrix, $W^m$, the normalized precoding matrix $W^m$ being determined by the corresponding SP based at least in part on the corresponding set of channel information $H^m$;
    allocating a virtual transmit power $\alpha^m P^w$ to each of the plurality of SPs based at least in part on the received service demands and normalized precoding matrices, $W^m$; and
    determining a downlink precoding matrix, V, to transmit messages to WDs, the precoder matrix V being based at least in part on the received service demands and normalized precoding matrices, $W^m$.

11. The method of claim 10, wherein the allocating of virtual transmit powers is based at least in part on attaining a specified balance between interference suppression/virtualization demand and achieving a specified performance.

12. The method of claim 11, wherein providing the specified balance is based at least in part on allocating a virtual transmit power $\alpha_c^m P_c^w$ to SP m in cell c, where $P_c^w \leq P_c^{max}$ is the virtual transmit power allocated to cell c, and $\alpha_c^m$ is a virtual transmit power allocation factor such that $\Sigma_{m \in \mathcal{M}} \alpha_c^m = 1$, and $P_c^{max}$ a maximum transmit power limit on the BS in cell c.

13. The method of claim 10, further comprising coordinating C cells at a beamforming level to determine the downlink precoding matrix V to meet a virtualization demand D based at least in part on the received service demands from the SPs.

14. The method of claim 10, wherein the determination of a downlink precoding matrix, V is based at least in part on a leakage function and a precoding deviation function.

15. The method of claim 10, wherein the downlink precoding matrix, V is based at least in part on minimization of a weighted sum of leakage and precoding deviation subject to per-cell maximum transmit power constraints.

16. The method of claim 10, wherein the downlink precoding matrix, V is based at least in part on minimization of a leakage subject to per cell precoding deviation and maximum transmit power constraints.

17. The method of claim 10, wherein the downlink precoding matrix V is based at least in part on minimization of a precoding deviation subject to per-cell leakage and maximum transmit power constraints.

18. The method of claim 10, further comprising basing the allocation of virtual transmit power $\alpha^m P^w$ on the received normalized precoding matrices, $W^m$, without exchange of channel state information (CSI) or transmit coordination across cells served by the network node.

19. A network node, the network node comprising:
  a radio interface configured to:
    receive channel information, $H^m$, from an infrastructure provider, InP;
    transmit a service demand and a normalized precoding matrix, $W^m$, to the InP; and
    receive a downlink precoding matrix, V, from the InP to transmit messages to WDs, the downlink precoder matrix V being based at least in part on service demands and normalized precoding matrices, W, of a plurality of service providers; and
  processing circuitry in communication with the radio interface, the processing circuitry configured to:

determine the normalized precoding matrix, $W^m$, based at least in part on the received channel information $H^m$; and apply the downlink precoder matrix V, to downlink transmissions of the network node to a plurality of wireless devices, WDs.

20. A method in a network node, the method comprising:

receiving channel information, $H^m$, from an infrastructure provider, InP;

determining a normalized precoding matrix, $W^m$, based at least in part on the received channel information $H^m$;

transmitting a service demand and a normalized precoding matrix, $W^m$, to the InP;

receiving a downlink precoding matrix, V, from the InP to transmit messages to WDs, the downlink precoder matrix V being based at least in part on service demands and normalized precoding matrices, W, of a plurality of service providers; and applying the downlink precoder matrix V, to downlink transmissions of the network node to a plurality of wireless devices, WDs.

* * * * *